US011975550B2

(12) # United States Patent
Minami et al.

(10) Patent No.: US 11,975,550 B2
(45) Date of Patent: May 7, 2024

(54) PRINTING DEVICE AND DATA CREATING DEVICE CREATING PRINT DATA FOR PRINTING IMAGE ON PRINTING MEDIUM INCLUDING HEAT-SENSITIVE LAYER

(71) Applicant: BROTHER KOGYO KABUSHIKI KAISHA, Nagoya (JP)

(72) Inventors: Akira Minami, Nagoya (JP); Keisuke Nishihara, Nagoya (JP); Isao Fukuchi, Gifu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 111 days.

(21) Appl. No.: 17/561,535

(22) Filed: Dec. 23, 2021

(65) Prior Publication Data

US 2022/0203707 A1 Jun. 30, 2022

(30) Foreign Application Priority Data

Dec. 28, 2020 (JP) ................................ 2020-218819

(51) Int. Cl.

*B41J 3/407* (2006.01)
*B41J 2/335* (2006.01)
*B41J 3/36* (2006.01)

(52) U.S. Cl.

CPC ......... *B41J 3/4075* (2013.01); *B41J 2/33515* (2013.01); *B41J 3/36* (2013.01)

(58) Field of Classification Search

CPC . B41J 2/32; B41J 3/4075; B41J 11/002; B41J 15/044; B41J 32/00; B65C 9/1803; B65C 9/1865; B65C 11/0215; B41M 2205/36; B41M 5/42; B41M 5/40; B41M 5/41

See application file for complete search history.

(56) References Cited

U.S. PATENT DOCUMENTS

2012/0039654 A1* 2/2012 Baines .................. A45D 40/04 401/68
2013/0021421 A1* 1/2013 Ishikawa .................... B41J 2/32 347/172
2020/0016905 A1 1/2020 Tsuchiya et al.

FOREIGN PATENT DOCUMENTS

JP 2008-006830 A 1/2008
JP 2020-15315 A 1/2020
WO 02/096665 A1 12/2002

* cited by examiner

*Primary Examiner* — Kristal Feggins
(74) *Attorney, Agent, or Firm* — KENEALY VAIDYA LLP

(57) ABSTRACT

A printing device includes: a thermal head; and a processor. The thermal head includes a heating element. The processor is configured to perform: (a) creating; and (b) driving. The (a) creating creates print data based on image data representing an image to be printed on a printing medium. The (b) driving drives the heating element to apply heat to the printing medium according to the print data. The processor is configured to further perform: (c) determining. The (c) determining determines whether to create a plurality of labels for lamination using at least one printing medium including a first printing medium. The first printing medium is transparent and includes a plurality of heat-sensitive layers laminated together. Each of the plurality of heat-sensitive layers is configured to develop a different color when heat is applied from the heating element. The (c) creating is performed in accordance with a determination result in (a).

6 Claims, 17 Drawing Sheets

FIRST LABEL

SECOND LABEL

FIRST LABEL

SECOND LABEL

PRINTING DEVICE AND DATA CREATING DEVICE CREATING PRINT DATA FOR PRINTING IMAGE ON PRINTING MEDIUM INCLUDING HEAT-SENSITIVE LAYER

CROSS REFERENCE TO RELATED APPLICATIONS

This application claims priority from Japanese Patent Application No. 2020-218819 filed Dec. 28, 2020. The entire content of the priority application is incorporated herein by reference.

BACKGROUND

A printing device known in the art prints images on a printing medium by applying heat from heating elements to the printing medium. The printing medium is configured of a plurality of image-forming layers laminated together. The image-forming layers are transparent Each of the image-forming layers produces a different color when heat is applied. Hence, the printing medium can express colors that cannot be developed in an individual image-forming layer. A plurality of types of print media is available. The order in which the image-forming layers are laminated is different for each of the types of print media. The printing device generates print data for driving the heating elements based on the type of the printing medium being used.

SUMMARY

If the printing medium is configured of a three-layer structure of image-forming layers laminated in the order of cyan (C), magenta (M), and yellow (Y), for example, the color green can be expressed by developing yellow and cyan in two of the image-forming layers, without developing the image-forming layer for magenta. However, since the image-forming layer for magenta constitutes the middle layer between the image-forming layers for yellow and cyan, expressing green requires difficult control to develop colors in the two outer image-forming layers. Consequently, the color gamut that can be reproduced in this printing medium is limited.

In view of the foregoing, it is an object of the present disclosure to provide a printing device and a data creating device capable of expanding the reproducible color gamut of the printing medium.

(1) In order to attain the above and other objects, according to one aspect, the present disclosure provides a printing device including: a thermal head; and a processor. The thermal head includes a heating element. The processor is configured to perform: (a) creating; and (b) driving. The (a) creating creates print data based on image data representing an image to be printed on a printing medium. The printing medium includes a heat-sensitive layer. The heat-sensitive layer is configured to develop a color when heat is applied from the heating element. The (b) driving drives the heating element to apply heat to the printing medium according to the print data created in (a). The processor is configured to further perform: (c) determining. The (c) determining determines whether to create a plurality of labels for lamination using at least one printing medium including a first printing medium. The first printing medium is transparent and includes a plurality of heat-sensitive layers laminated together. Each of the plurality of heat-sensitive layers is configured to develop a different color when heat is applied from the heating element. The (a) creating is performed in accordance with a determination result in (c).

According to aspect (1), the printing device determines whether to create a plurality of labels for lamination using at least one printing medium, and creates print data in accordance with the determination result. The printing device creates, in response to determining to create the plurality of labels for lamination, the corresponding print data. By printing the at least one printing medium based on the print data, the printing device creates labels that can be laminated on one another. Since the color gamut of colors expressible by the at least one printing medium is expanded when two or more labels are laminated together, the at least one printing medium can express specific colors that are otherwise difficult to reproduce by printing a single label. Further, conventional printing devices had to apply high voltages to the heating element in order to increase the size of the color dots being developed in the at least one printing medium since printing is performed quickly at a high temperature. However, the printing device according to aspect (1) can express dark colors even with low power by overlaying two or more colors.

(2) In the printing device according to aspect (1), it is preferable that the (a) creating creates, in response to determining in (c) to create the plurality of labels for lamination using the at least one printing medium. The print data includes a plurality of sets of color information. Each of the plurality of sets of color information represents a color of the image to be printed on a corresponding one of the plurality of labels. The plurality of sets of color information is at least partially different from one another.

According to aspect (2), since the printing device creates the print data for creating at least two labels, two or more labels that can be laminated on one another are created.

(3) In the printing device according to aspect (2), it is preferable that the processor is configured to further perform: (d) determining. The (d) determining determines, in response to determining in (c) to create the plurality of labels for lamination using the at least one printing medium, whether to create the plurality of labels using only the first printing medium. It is also preferable that the (a) creating creates, in response to determining in (d) to create the plurality of labels using only the first printing medium, the print data for creating the plurality of labels as a single concatenated label.

According to aspect (3), the printing device creates the print data for creating a plurality of labels as a single concatenated label. Hence, the print data for creating a plurality of labels for lamination can be created even if the printing device is not provided with a cutting mechanism such as a cutter. Further, creating a single label with two or more concatenated labels requires less margin between two neighboring labels than when creating the two or more labels individually. Consequently, the amount of used print media can be saved.

(4) In the printing device according to aspect (2), it is preferable that the image includes a specific region having a specific color. It is also preferable that the plurality of sets of color information included in the print data created in (a) represents respective ones of a plurality of colors for the specific region of the image. The plurality of colors is different from one another. The specific color is expressed by overlaying the plurality of colors on one another.

According to aspect (4), a plurality of labels overlaid on one another can be used to express colors that are not possible to produce in printing. Further, two or more colors with different color densities can be superimposed to express a darker color.

(5) In the printing device according to aspect (4), it is preferable that the specific color is expressed using at least two heat-sensitive layers from among the plurality of heat-sensitive layers. The at least two heat-sensitive layers includes a first heat-sensitive layer and a second heat-sensitive layer. The plurality of heat-sensitive layers includes a third heat-sensitive layer other than the at least two heat-sensitive layers. The third heat-sensitive layer is positioned between the first heat-sensitive layer and the second heat-sensitive layer in the first printing medium. The first heat-sensitive layer is configured to develop a first color when heat is applied from the heating element. The second heat-sensitive layer is configured to develop a second color different from the first color when heat is applied from the heating element. It is also preferable that the print data created in (a) includes first color information corresponding to the first label and second color information corresponding to the second label. The first color information represents the first color fix the specific region of the image.

According to aspect (5), the printing device can create the first label in which the first color is developed and the second label in which the second color is developed based on the created print data, for example. Hence, the two labels printed with the printing device and overlaid on one another can be used to express colors that are not possible to produce in a printing medium. Further, the size of each color dot being developed can be increased.

(6) The printing device according to aspect (1), preferably, further includes a memory. The memory is configured to store color gamut information indicating a first color that the first printing medium can reproduce when heat is applied from the heating element. It is preferable that the at least one printing medium further includes a second printing medium that can reproduce a second color gamut when heat is applied from the heating element. The plurality of labels includes a first label and a second label. The first printing medium corresponds to the first label. The second printing medium corresponds to the second label. It is also preferable that the (a) creating includes: (e) combining; (f) creating; (g) converting; and (h) converting. The (e) combining combines the first color gamut and the second color gamut to obtain a combined color gamut. The (f) creating creates temporary print data for printing the image based on the combined color gamut. The (g) converting converts the temporary print data to first print data for creating the first label based on the first color gamut. The (h) converting converts the temporary print data to second print data for creating the second label based on the second color gamut.

According to aspect (6), the printing device can create the print data corresponding to at least one printing medium used for lamination.

(7) According to another aspect, the present disclosure also provides a data creating device configured to create print data based on image data representing an image to be printed on a printing medium with a printing device. The printing device includes a thermal heat. The thermal head has a heating element. The printing medium includes a heat-sensitive layer. The heat-sensitive layer is configured to develop a color when heat is applied from the heating element drive according to the print data. The data creating device includes: a processor. The processor is configured to perform: (a) determining; and (b) creating. The (a) determining determines whether to create a plurality of labels for lamination using at least one printing medium. One of the at least one printing medium is transparent and includes a plurality of heat-sensitive layers laminated together. Each of the plurality of heat-Sensitive layers is configured to develop a different color when heat is applied from the heating element. The (b) creating creates the print data in accordance with a determination result in (a).

According to aspect (7), by printing the printing medium based on the print data created by the data creating device, the printing device can create labels that can be laminated on one another. Since the gamut of colors expressible by the printing medium is expanded when two or more labels are laminated together, the laminated labels can express the specific colors that are otherwise difficult to reproduce by the printing medium. Further, conventional printing devices had to apply high voltages to the heating element in order to increase the size of the color dots being developed in the printing medium since printing is performed quickly at a high temperature. However, the printing device according to aspect (7) can express dark colors even with low power by overlaying two or more colors.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Hereinafter, an embodiment of the present disclosure will be described while referring to the accompanying drawings. The referenced drawings are used to describe the technical features made possible with the present disclosure. The configurations, control, and the like of the apparatuses described below are merely example, and the present disclosure is not intended to be limited to these configurations, control, and the like.

Figure 1:
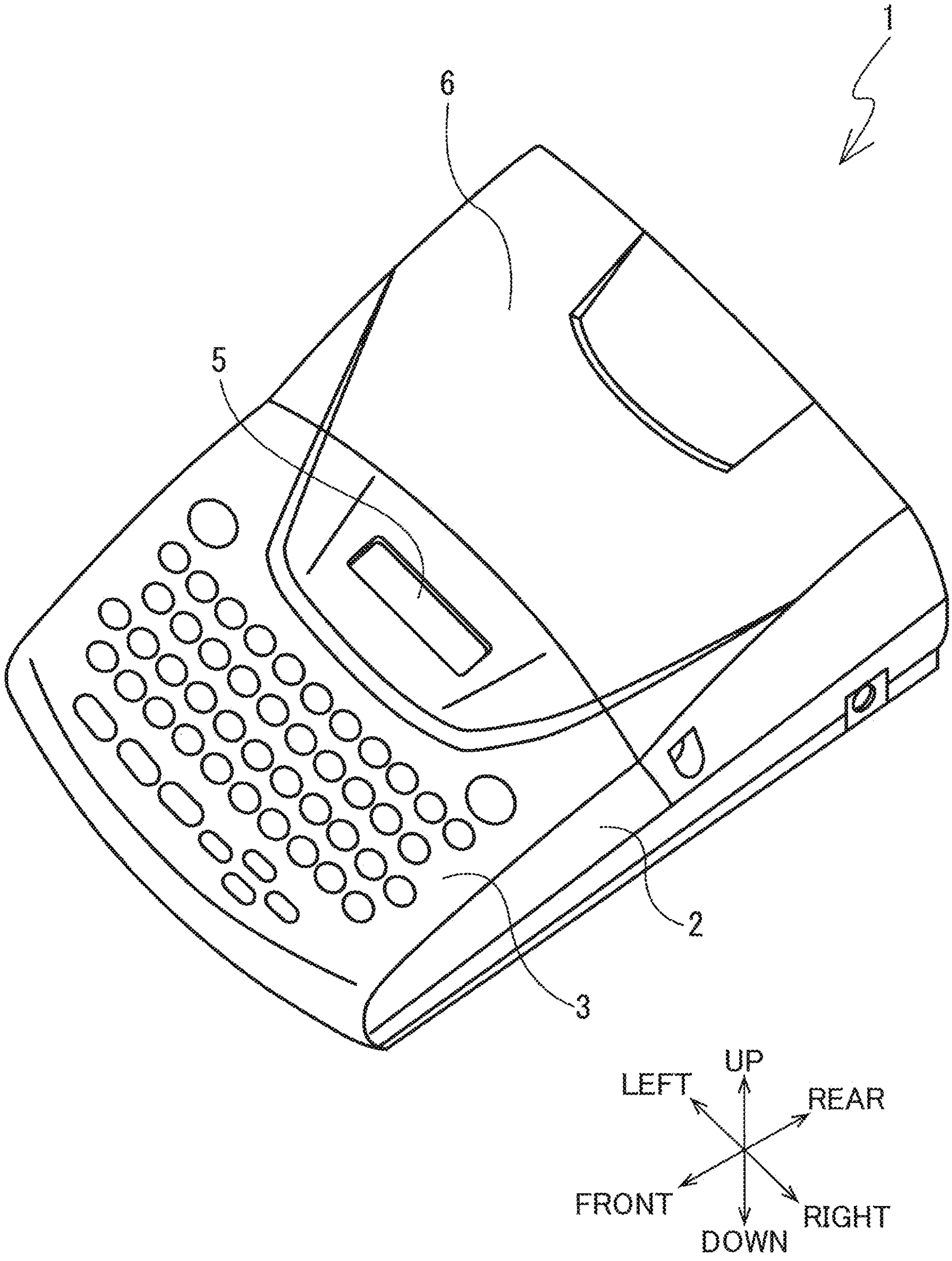
FIG. 1 is a perspective view of a printing device.
Figure 2:
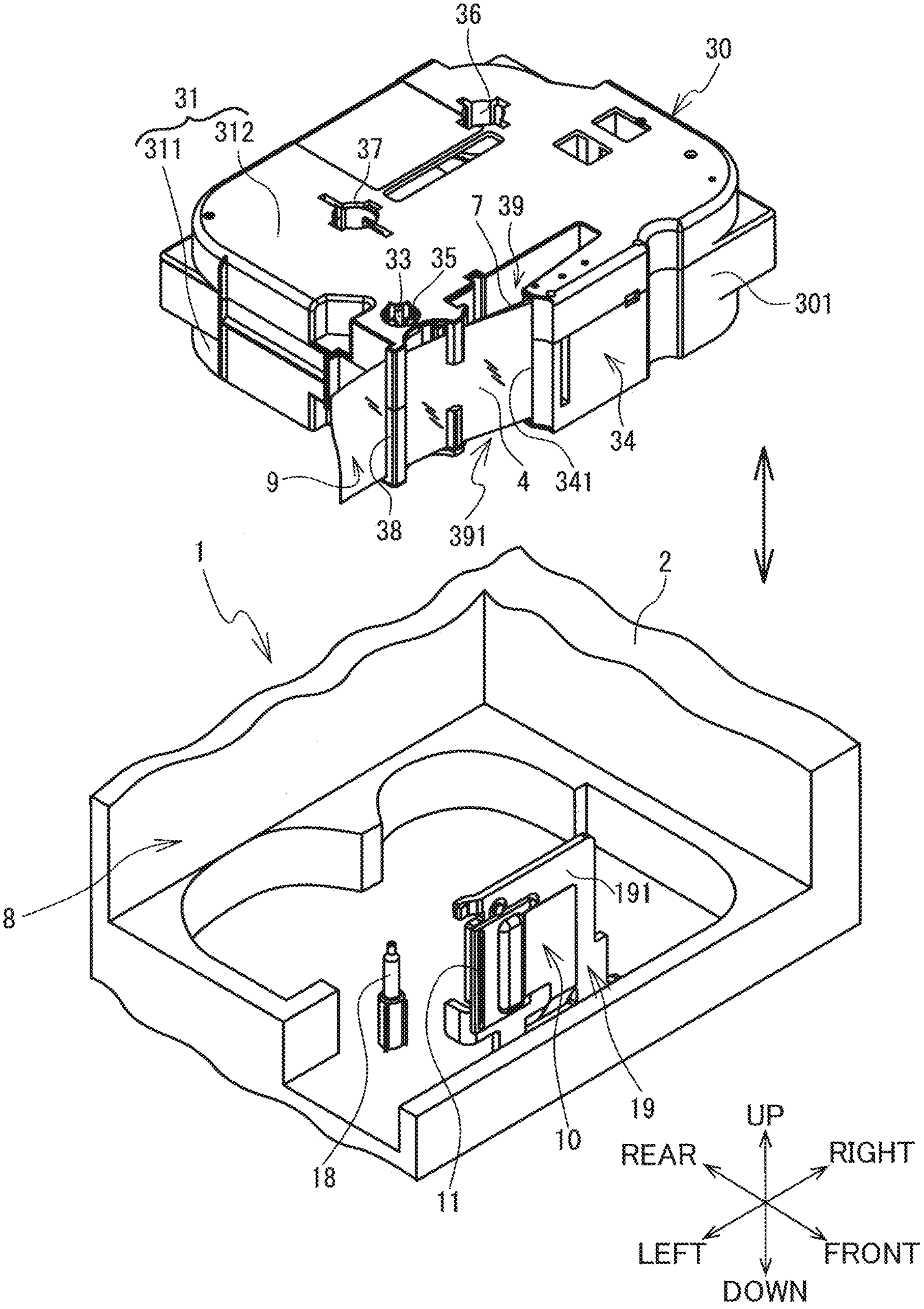
FIG. 2 is a perspective view of a tape cassette and a cassette attachment portion of the printing device.

Next, a printing system according to the present embodiment will be described. The printing system includes a printing device 1 (see FIG. 1) and a tape cassette 30 (see FIG. 2). In the following description, the lower-left side, upper right side, lower-right side, upper-left side, top side, and bottom side of the printing device 1 in FIG. 1 are respectively defined as the front side, rear side, right side, left side, top side, and bottom side of the printing device 1. The lower-right side, upper-left side, upper-right side, lower-left side, top side, and bottom side of the tape cassette 30 in FIG. 2 are respectively defined as the front side, rear side, right side, left side, top side, and bottom side of the tape cassette 30. Further, the tape cassette 30 mounted in a cassette attachment portion 8 of the printing device 1 (see FIG. 3) is depicted without an upper case 312 to facilitate understanding.

The printing device 1 is a thermal printer. Using the tape cassette 30, the printing device 1 can print alphanumeric characters, symbols, graphics, and the like on a heat-sensitive tape 4. Subsequently, the printing device 1 bonds an adhesive tape 7 to the heat-sensitive tape 4 to create a label 9.

The external structure of the printing device 1 will be described while referring to FIGS. 1 and 2. As shown in FIG. 1, the printing device 1 is provided with a device body 2. The device body 2 has a box shape. A keyboard 3 is provided on the top surface of the device body 2 in the front portion thereof. A user can input various types of information into the printing device 1 by operating the keyboard 3. A display 5 is provided in the top surface of the device body 2 to the rear of the keyboard 3. The display 5 can display inputted information.

A cassette cover 6 is provided to the rear of the display 5. The cassette cover 6 can be opened and closed on the device body 2 for exposing or covering the cassette attachment portion 8 described later (see FIG. 2). The user opens and closes the cassette cover 6 when replacing the tape cassette 30 (see FIG. 2). A discharge slit (not shown) is formed in the left side surface of the device body 2 in the rear portion thereof. The discharge slit allows the label 9 to be discharged from the printing device 1.

Next, the internal structure of the printing device 1 will be described with reference to FIGS. 1 and 2. As shown in FIG. 2, the cassette attachment portion 8 is provided inside the device body 2 below the cassette cover 6 (see FIG. 1). The cassette attachment portion 8 is a recessed part that is recessed downward from the top surface of the device body 2 with a shape in conformance with the shape of the tape cassette 30. Thus, when the cassette cover 6 is open, the tape cassette 30 can be mounted in and removed from the cassette attachment portion 8. A head holder 19 is disposed in a front section of the cassette attachment portion 8. The head holder 19 has a plate-like shape and extends in vertical and left-right directions. The head holder 19 has a front surface 191. A thermal head 10 is provided on the front surface 191 of the head holder 19. The thermal head 10 includes a plurality of heating elements 11. The heating elements 11 are arranged in line with respect to the vertical direction. In a printing process, the thermal head 10 applies heat with the heating elements 11 to the heat-sensitive tape 4 exposed through an opening 341 (described later) while the tape cassette 30 is mounted in the cassette attachment portion 8.

A drive shaft 18 is disposed diagonally leftward and rearward from the head holder 19. The drive shaft 18 extends upward from the bottom surface of the cassette attachment portion 8. A conveying motor 85 (see FIG. 10) drives the drive shaft 18 to rotate. The drive shaft 18 conveys the heat-sensitive tape 4 and the adhesive tape 7.

Figure 3:
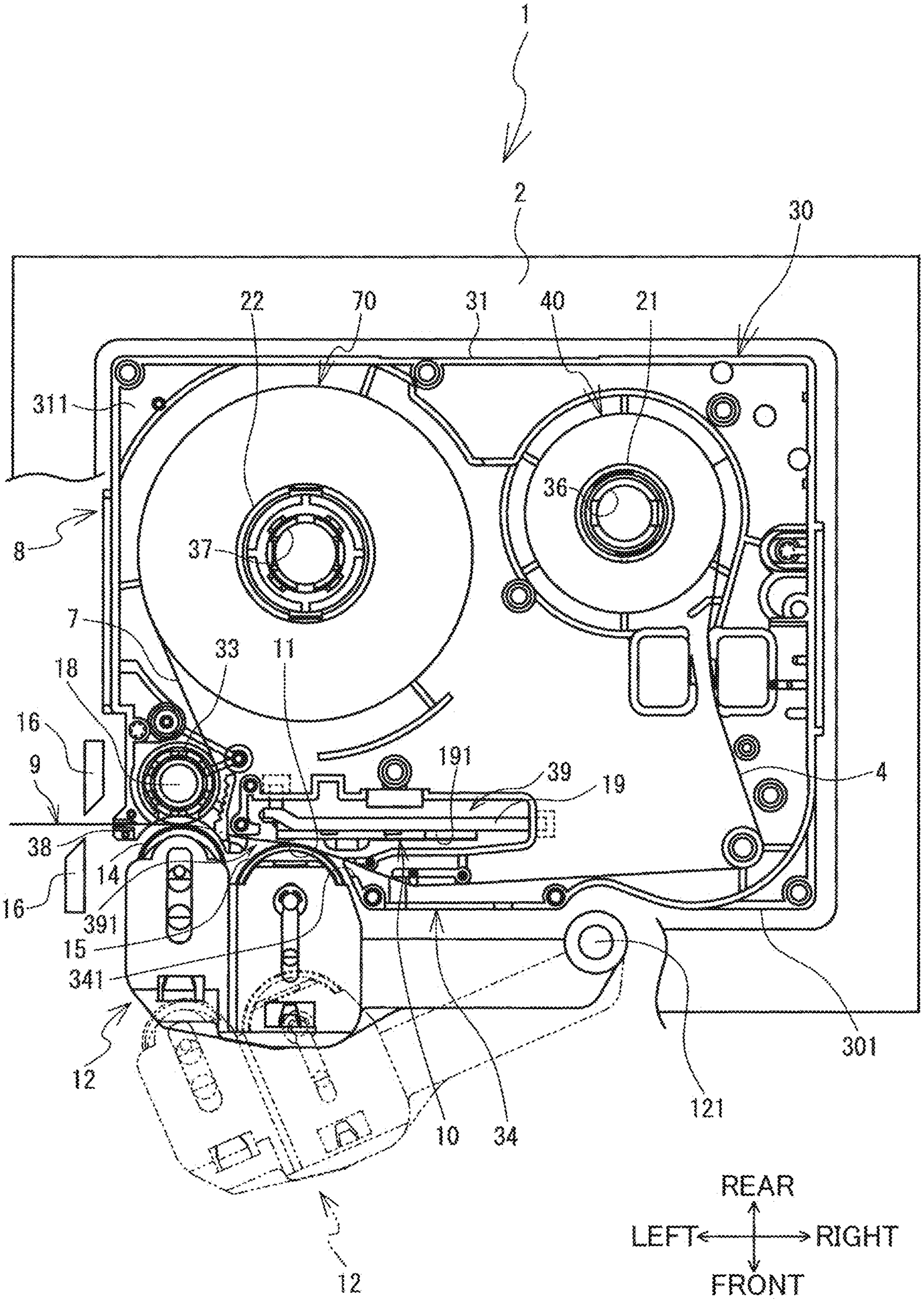
FIG. 3 is a plan view of the cassette attachment portion in which the tape cassette is mounted.

As shown in FIG. 3, a cutting mechanism 16 is provided in the device body 2 on the left side of the drive shaft 18. When driven by a cutting motor 86 (see FIG. 10) provided in the printing device 1, the cutting mechanism 16 cuts the label 9. A platen holder 12 is provided in the device body 2 on the front side of the head holder 19. The platen holder 12 is an arm-like member and is pivotably supported by a support shaft 121 about an axis thereof aligned in the vertical direction. The support shaft 121 is disposed on the right end of the platen holder 12.

A platen roller 15 and a pinch roller 14 are rotatably supported on a free end portion of the platen holder 12. The platen roller 15 is configured to contact and separate from the thermal head 10 in accordance with the pivotal movement of the platen holder 12. The pinch roller 14 is disposed on the left side of the platen roller 15. The pinch roller 14 is configured to contact and separate from a conveying roller 33 (described later) along with the pivotal movement of the platen holder 12.

In the present embodiment, the platen holder 12 is configured to move toward a standby position (the position depicted by dashed lines in FIG. 3) when the cassette cover 6 is open, and to move toward a printing position (the position depicted by solid lines in FIG. 3) when the cassette cover 6 is closed. In the standby position, the platen holder 12 is separated from the cassette attachment portion 8. Accordingly, the tape cassette 30 can be mounted in or removed from the cassette attachment portion 8.

In the printing position, the platen holder 12 is positioned adjacent to the cassette attachment portion 8. Accordingly, when the tape cassette 30 is mounted in the cassette attachment portion 8 and the cassette cover 6 is closed, the platen roller 15 presses the heat-sensitive tape 4 against the thermal head 10, and the pinch roller 14 presses the heat-sensitive tape 4 and adhesive tape 7 against the conveying roller 33 such that the heat-sensitive tape 4 and adhesive tape 7 are overlapped with each other.

The conveying motor 85 (see FIG. 10) is configured to drive the platen roller 15 to rotate together with the drive shaft 18. In order to avoid slack in the heat-sensitive tape 4 during conveyance of the heat-sensitive tape 4, the platen roller 15 and drive shaft 18 are coupled to the conveying motor 85 through a plurality of gears (not shown) so that a rotational speed of the platen roller 15 is slower than a rotational speed of the drive shaft 18 (the conveying roller 33).

Next, the tape cassette 30 will be described with reference to FIGS. 2 and 3. As shown in FIG. 2, the tape cassette 30 includes a cassette case 31. The cassette case 31 is a substantially rectangular parallelepiped case configured by assembling together a lower case 311 and the upper case 312.

An arm part 34 is provided on a front surface 301 of the cassette case 31. The arm part 34 extends leftward and forward from the right-front portion of the cassette case 31. The opening 341 is formed in the left end of the arm part 34. The opening 341 has a slit-like shape that is elongated vertically. The heat-sensitive tape 4 pulled off a first supply roll 40 described later (see FIG. 3) is configured to be discharged from the cassette case 31 through the opening 341. In this way, a portion of the heat-sensitive tape 4 is exposed on the outside of the cassette case 31.

A head insertion section 39 is formed in the cassette case 31 on the rear side of the arm part 34. The head insertion section 39 penetrates the cassette ease 31 vertically. The left-front portion of the head insertion section 39 opens forward. Hereinafter, this opening will be called a head opening 391. The head opening 391 is positioned downstream (leftward) of the opening 341 formed in the arm part 34 with respect to a conveying direction of the heat-sensitive tape 4. The head holder 19 is inserted into the head insertion section 39 when the tape cassette 30 is mounted in the cassette attachment portion 8.

The conveying roller 33 is provided to the left side of the head insertion section 39. The conveying roller 33 is positioned between the opening 341 and a guide part 38 (described later) in the conveying direction of the heat-sensitive tape 4 (leftward direction). The conveying roller 33 is cylindrical in shape and elongated vertically. The conveying roller 33 has a front portion that is exposed frontward from the cassette case 31. The conveying roller 33 supports the adhesive tape 7 so that the heat-sensitive tape 4 and adhesive tape 7 are in a superimposed state. The conveying roller 33 is rotatably supported in a support hole 35. The support hole 35 penetrates the cassette case 31 vertically. The drive shaft 18 is inserted inside the conveying roller 33 when the tape cassette 30 is mounted in the cassette attachment portion 8. The drive shaft 18 is configured to drive the conveying roller 33 to rotate, so that the rotating conveying roller 33 can convey the heat-sensitive tape 4 and adhesive tape 7.

The guide part 38 is formed in the left-front corner portion of the cassette ease 31. The guide part 38 is positioned downstream (left side) of the opening 341 in the conveying direction and downstream of the conveying roller 33 in the conveying direction. The guide part 38 has a slit-like shape that extends vertically. When conveyed by the conveying roller 33, the label 9 passes through the inside of the guide part 38. At this time, the guide part 38 support the widthwise ends of the label 9 so that the label 9 can maintain an orientation thereof while being discharged from the cassette case 31. In other words, the guide part 38 guides the label 9 to the outside of the cassette case 31.

As shown in FIG. 3, the first supply roll 40 and a second supply roll 70 are accommodated inside the cassette case 31. The first supply roll 40 is provided in the right-rear portion of the cassette case 31 and supplies the heat-sensitive tape 4. The first supply roll 40 is configured of: a first tape spool 21; and the heat-sensitive tape 4 that is wound clockwise in a plan view over the first tape spool 21 so as to gradually separate from the rotational center of the first tape spool 21. Specifically, the heat-sensitive tape 4 is wound about the first tape spool 21 such that a plurality of heat-sensitive layers 42 is on the inside of a base material 41 described later (see FIG. 4A). The first tape spool 21 is rotatably supported in a support hole 36. The support hole 36 penetrates the cassette case 31 vertically.

The second supply roll 70 is disposed in the left-rear portion of the cassette case 31 on the left side of the first supply roll 40 and supplies the adhesive tape 7. The second supply roll 70 is configured of: a second tape spool 22; and the adhesive tape 7 that is wound over the second tape spool 22 in a counterclockwise direction in a plan view so as to gradually separate from the rotational center of the second tape spool 22. More specifically, the adhesive tape 7 is wound about the second tape spool 22 so that a first adhesive layer 73 is on the inside of a second adhesive layer 74 (and a release paper 75) described later (see FIG. 4B). The second tape spool 22 is rotatably supported in a support hole 37. The support hole 37 penetrates the cassette case 31 vertically.

Next, the structure of the heat-sensitive tape 4 will be described with reference to FIGS. 4A, 4B, and 4C. In the following description, the top side and bottom side of each tape shown in FIGS. 4A, 4B, and 4C will be referred to as the top and bottom of the tape.

Figure 4A:
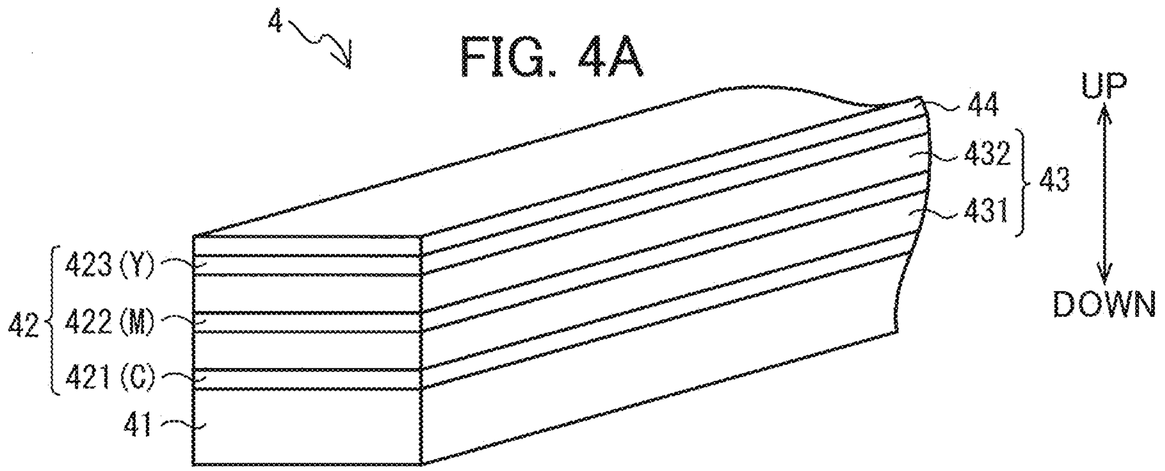
FIG. 4A is a perspective view of a heat-sensitive tape.
Figure 4B:
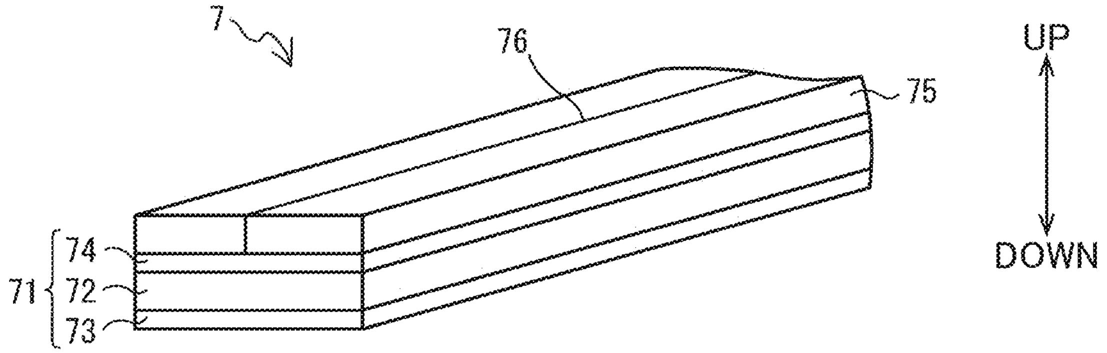
FIG. 4B is a perspective view of an adhesive tape.

As shown in FIG. 4A, the heat-sensitive tape 4 is a long strip of a medium configured of a plurality of laminated layers. Specifically, the heat-sensitive tape 4 has the base material 41, a plurality of heat-sensitive layers 42, a plurality of heat-insulating layers 43, and an overcoat layer 44 (hereinafter collectively referred to as the "layers of the heat-sensitive tape 4"). The heat-sensitive layers 42 include a first heat-sensitive layer 421, a second heat-sensitive layer 422, and a third heat-sensitive layer 423. The heat-insulating layers 43 include a first heat-insulating layer 431, and a second heat-insulating layer 432.

The base material 41, first heat-sensitive layer 421, first heat-insulating layer 431, second heat-sensitive layer 422, second heat-insulating layer 432, third heat-sensitive layer 423, and overcoat layer 44 are laminated in a thickness direction of the heat-sensitive tape 4 (the vertical direction in FIG. 4A) in the order given, beginning from the bottom of the heat-sensitive tape 4. Thus, the overcoat layer 44 is provided opposite the base material 41 with respect to the heat-sensitive layers 42. Specifically, the overcoat layer 44 constitutes the top surface of the heat-sensitive tape 4.

The base material 41 is a resin film, and specifically a non-foamed resin film, and more specifically a non-foamed polyethylene terephthalate (PET) film. In other words, gas bubbles are not trapped inside the base material 41.

Each of the heat-sensitive layers 42 produces a corresponding color when heated to a color-developing temperature specific to that layer. The heat-sensitive layers 42 achieve this effect through the use of chemicals, such as those described in Japanese Patent Application Publication No. 2008-006830.

The first heat-sensitive layer 421 is formed as a film by coating the bottom surface of the first heat-insulating layer 431 with a chemical agent. The first heat-sensitive layer 421 produces a first color when heated above a first temperature. In the present embodiment, the first color is cyan.

The second heat-sensitive layer 422 is formed as a film by coating the bottom surface of the second heat-insulating layer 432 with a chemical agent. The second heat-sensitive layer 422 produces a second color when heated above a second temperature. The second temperature is higher than the first temperature. In the present embodiment, the second color is magenta.

The third heat-sensitive layer 423 is formed as a film by coating the top surface of the second heat-insulating layer 432 with a chemical agent. The third heat-sensitive layer 423 produces a third color when heated above a third temperature. The third temperature is higher than the second temperature. In the present embodiment, the third color is yellow.

The heat-insulating layers 43 are sheet-like layers. Owing to their low thermal conductivity, the heat-insulating layers 43 function as resistors to heat conduction. Accordingly, a temperature gradient along a direction of heat transfer is produced within each of the heat-insulating layers 43. As will be described later, when the thermal head 10 applies heat to the heat-sensitive tape 4 from the top side in FIGS. 4A, 4B, and 4C, the temperature on the bottom surface of each layer of the heat-insulating layers 43 will be lower than the temperature on the top surface of the corresponding layer of the heat-insulating layers 43. In this way, each layer in the heat-insulating layers 43 can produce a desired difference in temperature between the two layers of the heat-sensitive layers 42 neighboring the corresponding layer in the heat-insulating layers 43 on the top and bottom sides thereof according to the thermal conductivity of each layer in the heat-insulating layers 43.

Specifically, the second heat-insulating layer 432 can produce a lower temperature in the second heat-sensitive layer 422 than the temperature in the third heat-sensitive layer 423. Similarly, the first heat-insulating layer 431 can produce a lower temperature in the first heat-sensitive layer 421 than the temperature in the second heat-sensitive layer 422. In this way, the heat-sensitive tape 4 can be configured to use the effect of the heat-insulating layers 43 to deliberately control the temperature of the first heat-sensitive layer 421 at a temperature higher than the first temperature and lower than the second temperature, the temperature of the second heat-sensitive layer 422 at a temperature higher than the second temperature and lower than the third temperature, and the temperature of the third heat-sensitive layer 423 at a temperature higher than the third temperature.

The overcoat layer 44 is formed as a film by coating the top surface of the third heat-sensitive layer 423. The overcoat layer 44 can transmit more blue visible light (light having a wavelength of about 470 nm, for example) than yellow visible light (light having a wavelength of about 580 nm, for example). Thus, the overcoat layer 44 has lower visible light transmittance for yellow than visible light transmittance for blue. The overcoat layer 44 protects the heat-sensitive layers 42 on the opposite side of the heat-sensitive tape 4 from the base material 41 (i.e., the top surface of the heat-sensitive tape 4).

Overall, the heat-sensitive tape 4 has visible light transmittance in the thickness direction of the heat-sensitive tape 4. In other words, all layers of the heat-sensitive tape 4 have visible light transmittance. The visible light transmittance (%) of the base material 41 may be the same as the visible light transmittance of at least one of the heat-sensitive layers 42, heat-insulating layers 43, and overcoat layer 44; or may differ from the visible light transmittance of all these layers. The visible light transmittance for each layer of the heat-sensitive tape 4 is at least 90%, for example, and preferably at least 99%, and more preferably at least 99.9%. Even if less than 90%, the visible light transmittance for each layer should be at least sufficiently high for the user to visualize colors produced in the heat-sensitive layers 42 through the base material 41. The layers of the heat-sensitive tape 4 may be transparent or translucent, but are preferably transparent.

The ultraviolet light transmittance (%) of the base material 41 is lower than that of the first heat-insulating layer 431, and specifically lower titan the ultraviolet light transmittance of any layer in the heat-insulating layers 43.

The thermal conductivity of the base material 41 is lower than the thermal conductivity of the first heat-insulating layer 431, and specifically lower than the thermal conductivity of any layer in the heat-insulating layers 43. Thermal conductivity (W/K) of a layer is a product of the thermal conductivity of the layer material (W/(m·K)) and the layer thickness (m).

The base material 41 has a refractive index that is higher than that of the first heat-insulating layer 431, and specifically higher than the refractive index of any layer in the heat-insulating layers 43.

The base material 41 has a thickness that is greater than the thickness of the first heat-insulating layer 431, and specifically greater than the thickness of any layer in the heat-insulating layers 43. The thickness of a layer corresponds to a vertical dimension of the layer in FIG. 4A. In FIG. 4A, the thickness for each layer of the heat-sensitive tape 4 and the relationship among magnitudes of thicknesses of the layers are depicted schematically to facilitate understanding, though the actual layer thicknesses and relationships among these thicknesses may differ from those given in FIG. 4A (this also applies to FIGS. 4B, 5A, and 5B) For example, the thickness of the overcoat layer 44 may be greater than the thickness of each of the heat-sensitive layers 42, or may be the same or smaller than the thickness of each of the heat-sensitive layers 42.

Next, the structure of the adhesive tape 7 will be described. As shown in FIG. 4B, the adhesive tape 7 is a long strip-like medium and is configured of a plurality of laminated layers. Specifically, the adhesive tape 7 includes a double-sided adhesive tape 71 and the release paper 75. The double-sided adhesive tape 71 is white in color. The double-sided adhesive tape 71 has a sheet 72, the first adhesive layer 73, and the second adhesive layer 74. The sheet 72 is transparent.

The first adhesive layer 73 is provided on the bottom surface of the sheet 72. The second adhesive layer 74 is provided on the top surface of the sheet 72. That is, the double-sided adhesive tape 71 is configured by applying adhesive to both top and bottom surfaces of the sheet 72.

The release paper 75 is bonded to the double-sided adhesive tape 71 through the second adhesive layer 74. A score line 76 is formed in the release paper 75. The score line 76 extends in a longitudinal direction of the adhesive tape 7 and divides the release paper 75 in two in a lateral direction thereof. The score line 76 does not penetrate into the double-sided adhesive tape 71, and, hence, does not reach the first adhesive layer 73 opposite the release paper 75. The sheet 72 is formed continuously across the score line 76 and, thus, the double-sided adhesive tape 71 is formed continuously across the score line 76. In other words, a portion of the adhesive tape 7 is cut in a thickness direction thereof.

Next, the structure of the label 9 will be described. As shown in FIG. 4C, the label 9 is configured by bonding the bottom surface of the adhesive tape 7 to the top surface of the printed heat-sensitive tape 4. Accordingly, the label 9 includes the base material 41, first heat-sensitive layer 421, first heat-insulating layer 431, second heat-sensitive layer 422, second heat-insulating layer 432, third heat-sensitive layer 423, overcoat layer 44, first adhesive layer 73, sheet 72, second adhesive layer 74, and release paper 75 that are stacked in the thickness direction in the order given.

Figure 4C:
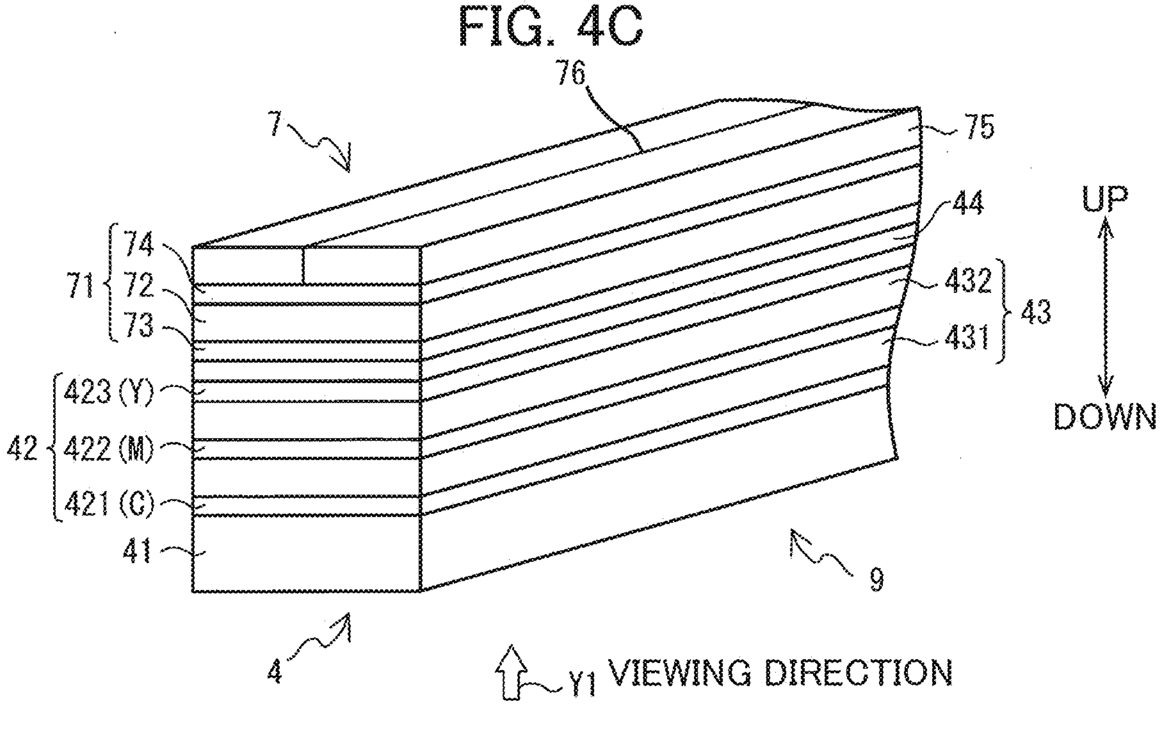
FIG. 4C is a perspective view of a label.

The user views the label tape 9 from the base material 41 side (i.e., the bottom side of the label 9), as indicated by a viewing direction Y1 in FIG. 4C. Since the heat-sensitive tape 4 has visible light transmittance as a whole, the user can see developed colors (i.e., printed images) in each of the heat-sensitive layers 42 through the base material 41 when viewing the label 9 from the base material 41 side. Since the double-sided adhesive tape 71 is transparent in the present embodiment, the user can see the background of the label 9 when viewing the label 9 from the base material 41 side. The user can use the label 9 by peeling the release paper 75 off the double-sided adhesive tape 71 and affixing the label 9 to a given wall, mount, or the like, for example. In this case, the adherend such as a given wall or the like can be seen as a background.

Note that the user cannot see developed colors (i.e., the printed images) in the heat-sensitive layers 42 from the adhesive tape 7 side (i.e., the top surface side of the label 9), even after peeling the release paper 75 off the double-sided adhesive tape 71, because the double-sided adhesive tape 71 is present on top of the heat-sensitive layers 42 (i.e., in front of the heat-sensitive layers in the viewing direction Y1).

Next, conveying paths for the heat-sensitive tape 4 and adhesive tape 7 will be described. As shown in FIG. 3, the heat-sensitive tape 4 is drawn frontward off the right side of the first supply roll 40, and then turned leftward in the right-front corner portion of the cassette case 31. The heat-sensitive tape 4 passes through the inside of the arm part 34 and subsequently exits the cassette case 31 through the opening 341.

Figure 5A:
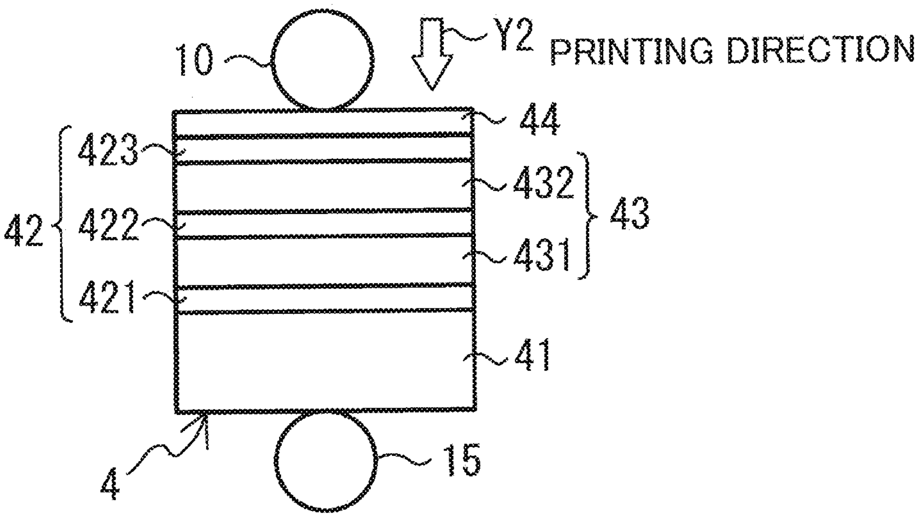
FIGS. 5A and 5B are explanatory diagrams illustrating a printing process with the printing device.

While in the head opening 391, the side of the heat-sensitive tape 4 having the heat-sensitive layers 42 (the top side of the heat-sensitive tape 4) opposes the thermal head 10 while the base material 41 side of the heat-sensitive tape 4 (the bottom side of the heat-sensitive tape 4) opposes the platen roller 15, as illustrated in FIG. 5A. Thus, while the tape cassette 30 is mounted in the cassette attachment portion 8, the thermal head 10 is positioned opposite the base material 41 with respect to the heat-sensitive layers 42 (i.e., the rear side of the heat-sensitive tape 4). Accordingly, the thermal head 10 can heat the heat-sensitive tape 4 in the head opening 391 on the opposite side of the heat-sensitive tape 4 from the base material 41 (see a printing direction Y2).

Figure 5B:
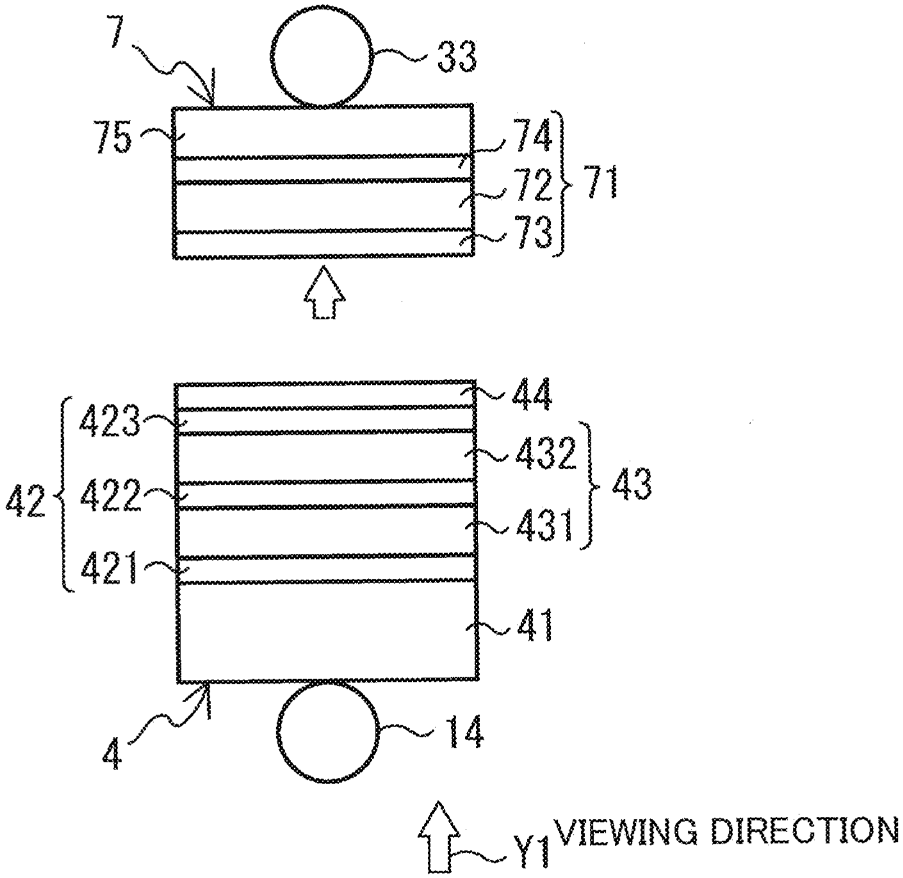

As shown in FIG. 3, the heat-sensitive tape 4 passes through the head opening 391 and between the conveying roller 33 and pinch roller 14. At this time, the heat-sensitive layers 42 side of the heat-sensitive tape 4 opposes the conveying roller 33. While the base material 41 side of the heat-sensitive tape 4 opposes the pinch roller 14, as illustrated in FIG. 5B.

As shown in FIG. 3, the adhesive tape 7 is pulled frontward from the left side of the second supply roll 70. The adhesive tape 7 then curves leftward while in contact with a right-front circumferential portion of the conveying roller 33. At this time, the release paper 75 side of the adhesive tape 7 (the top side of the adhesive tape 7) opposes the conveying roller 33 while the double-sided adhesive tape 71 side (the bottom side of the adhesive tape 7) opposes the pinch roller 14, as illustrated in FIG. 5B. Accordingly, with the adhesive tape 7 overlapping the heat-sensitive tape 4 on the opposite side of the heat-sensitive layers 42 from the base material 41, the conveying roller 33 supports the adhesive tape 7 from the opposite side of the heat-sensitive tape 4.

With the heat-sensitive tape 4 and adhesive tape 7 superimposed, the heat-sensitive tape 4 and adhesive tape 7 are bonded together between the pinch roller 14 and conveying roller 33, thereby forming the label 9. As shown in FIG. 3, the label 9 is discharged from the tape cassette 30 after passing through the interior of the guide part 38. The label 9 is conveyed to a prescribed position relative to the cutting mechanism 16, and the cutting mechanism 16 cuts the label 9. Once cut, the label 9 is discharged from the printing device 1 through the discharge slit formed in the device body 2.

Figure 6:
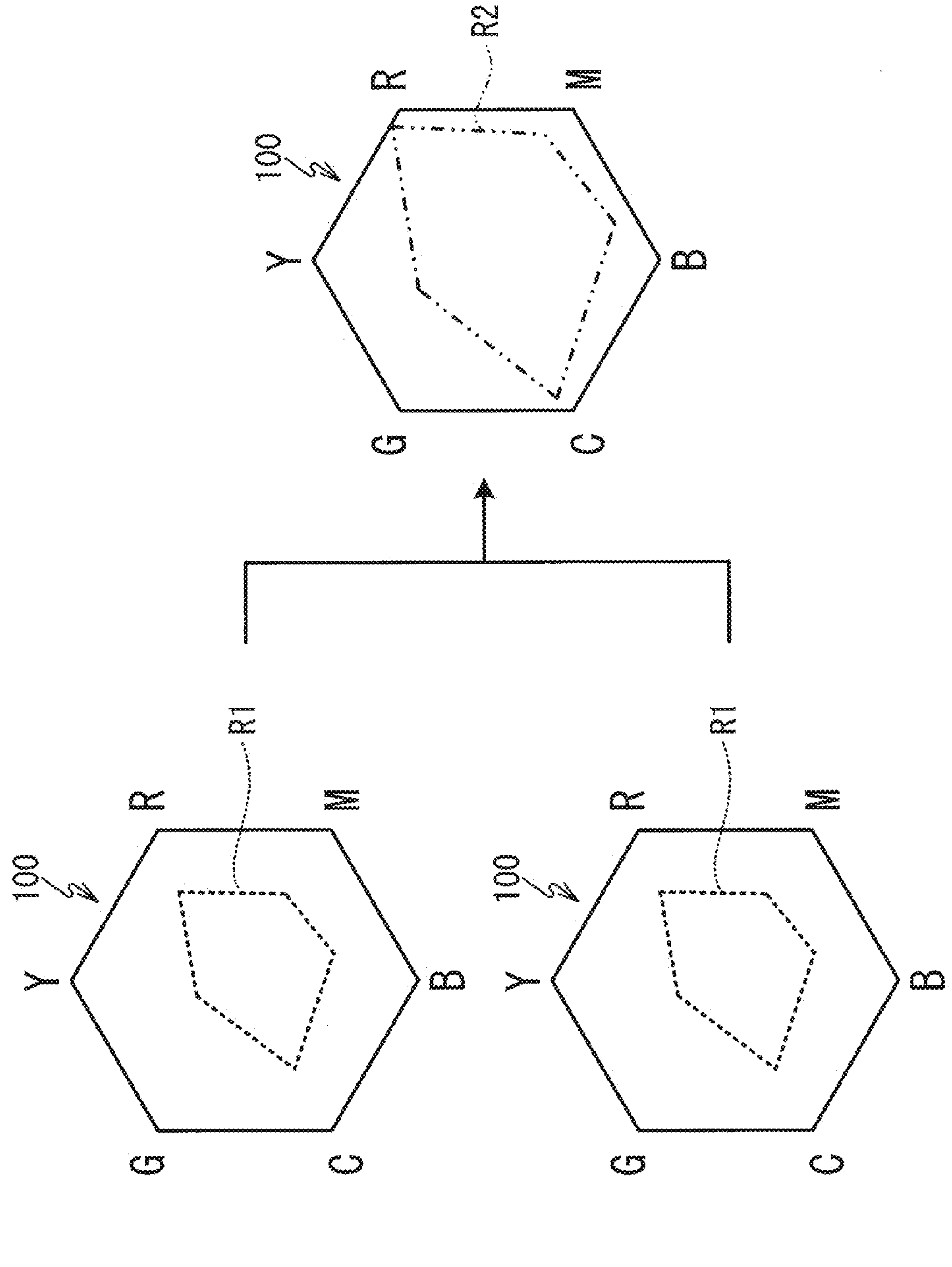
FIG. 6 is an explanatory diagram illustrating a process of combining two identical color gamuts to create a combined color gamut.
Figure 7:
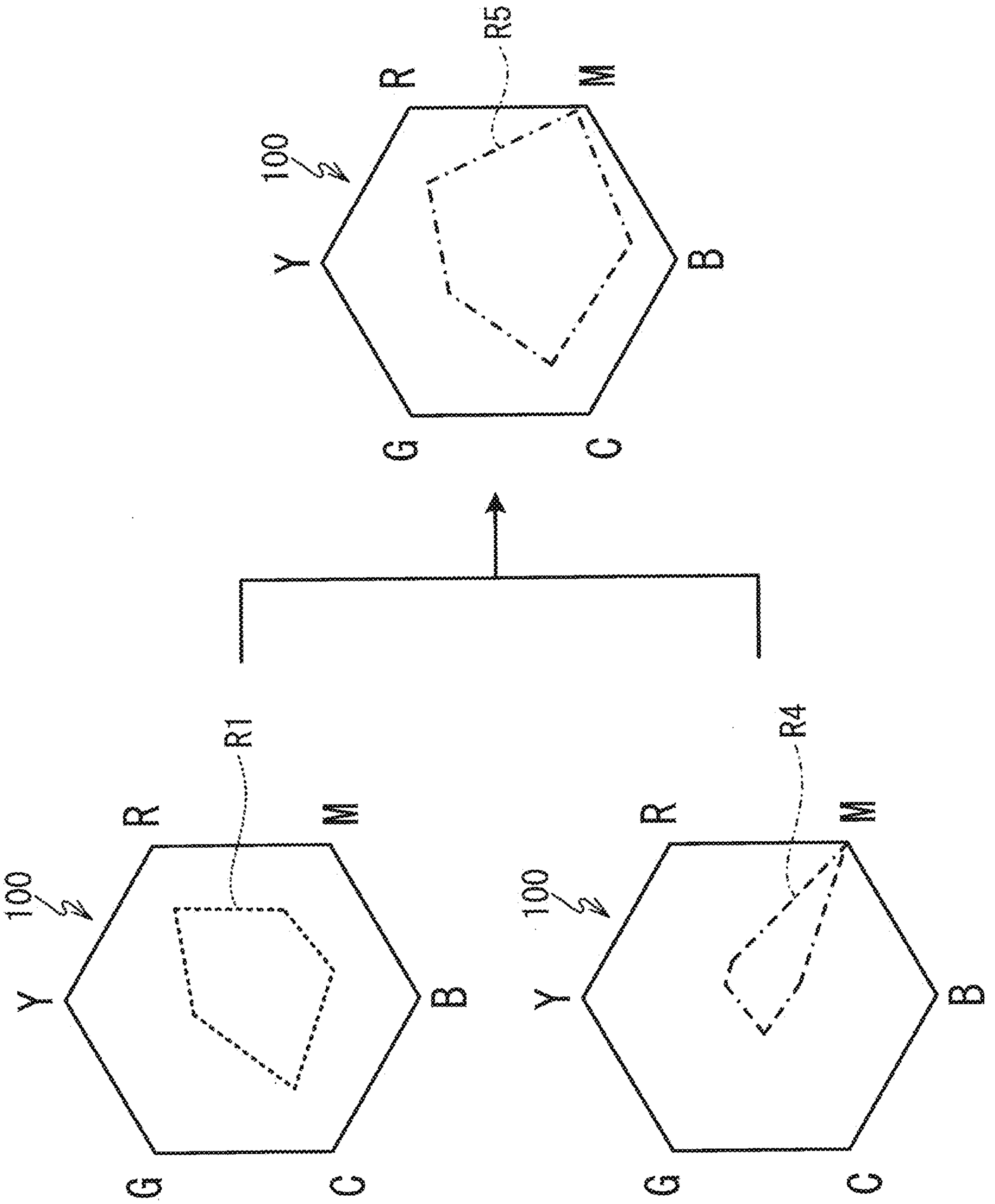
FIG. 7 is an explanatory diagram illustrating a process of combining two different color gamuts to create a combined color gamut.

Next, the color gamut that the label 9 (the heat-sensitive tape 4) can reproduce will be described with reference to FIGS. 6 and 7. "Color gamut" in the present embodiment denotes a color reproduction range that can be reproduced when printing on the printing device 1. FIG. 6 shows a standard color gamut 100. The standard color gamut 100 is a standardized color reproduction range depicted by a hexagon having the six basic colors cyan (C), magenta (M), yellow (Y), red (R), green (G), and blue (B) as vertices. Here, the common L*a*b* color space is projected on the a*b* plane. In other words, since the standard color gamut 100 shown in FIG. 6 has an L* axis not shown in the drawing, the center of the hexagon denotes white on the +side of the L* axis and black on the 0 side. The six basic colors that can be expressed are the six vertices of the standard color gamut 100. The color gamut varies according to the type of heat-sensitive tape 4. In the present embodiment, the color gamut of the label 9 is equivalent to the color gamut of the heat-sensitive tape 4.

A color gamut R1 is the color reproduction range determined by the type of heat-sensitive tape 4 used for printing on the printing device 1. The color gamut R1 is smaller than the standard color gamut 100. Colors outside the color gamut R1 cannot be reproduced with the heat-sensitive tape 4. Hence, when an image to be printed on the label 9 includes colors outside the color gamut R1, proper color reproduction can be difficult.

In the present embodiment, a plurality of labels 9 overlaid on one another can be used to express colors that are not possible to produce with a single label 9. For example, two labels 9 are printed on the printing device 1 using the same tape cassette 30. Here, the same tape cassette 30 signifies that the type of heat-sensitive tape 4 accommodated in the tape cassettes 30 is the same. Hence, a color gamut R2 resulting from using two printed labels 9 overlaid on each other is a range produced by combining two color gamuts R1 and is depicted by a larger pentagon than the color gamut R1. Hence, the possible color gamut can be expanded by superimposing a plurality of labels 9.

An alternative method is to print two labels on the printing device 1 while using different types of heat-sensitive tape for the first label and second label. As an example, the first label is printed with a tape cassette 30 accommodating a heat-sensitive tape 4 having the three layers cyan (C), magenta (M), and yellow (Y), while the second label is printed with a tape cassette accommodating a heat-sensitive tape having a single layer for the color magenta (M). As shown in FIG. 7, R1 represents the color gamut of the heat-sensitive tape 4 having the three CMY layers, and R4 denotes the color gamut of the heat-sensitive tape having the single M layer. The color gamuts R1 and R4 have different shapes. R5 is the color gamut produced when combining the color gamuts R1 and R4. The color gamut R5 is depicted by a larger pentagon than the color gamut R1.

In the present embodiment, two labels 9, for example, are bonded together to produce a composite label 90 that can properly express colors that are difficult to render with a single label 9. By executing a print control process described later (see FIG. 11), the printing device 1 can create print data for generating a plurality of labels to be bonded together. While only two labels 9 are bonded together in both examples of FIGS. 6 and 7, three or more labels 9 may be bonded together. The color gamut that is available when labels 9 are superimposed is the range of colors produced by combining the color gamut of each label and, hence, varies according to the number of labels that are bonded together.

Figure 8:
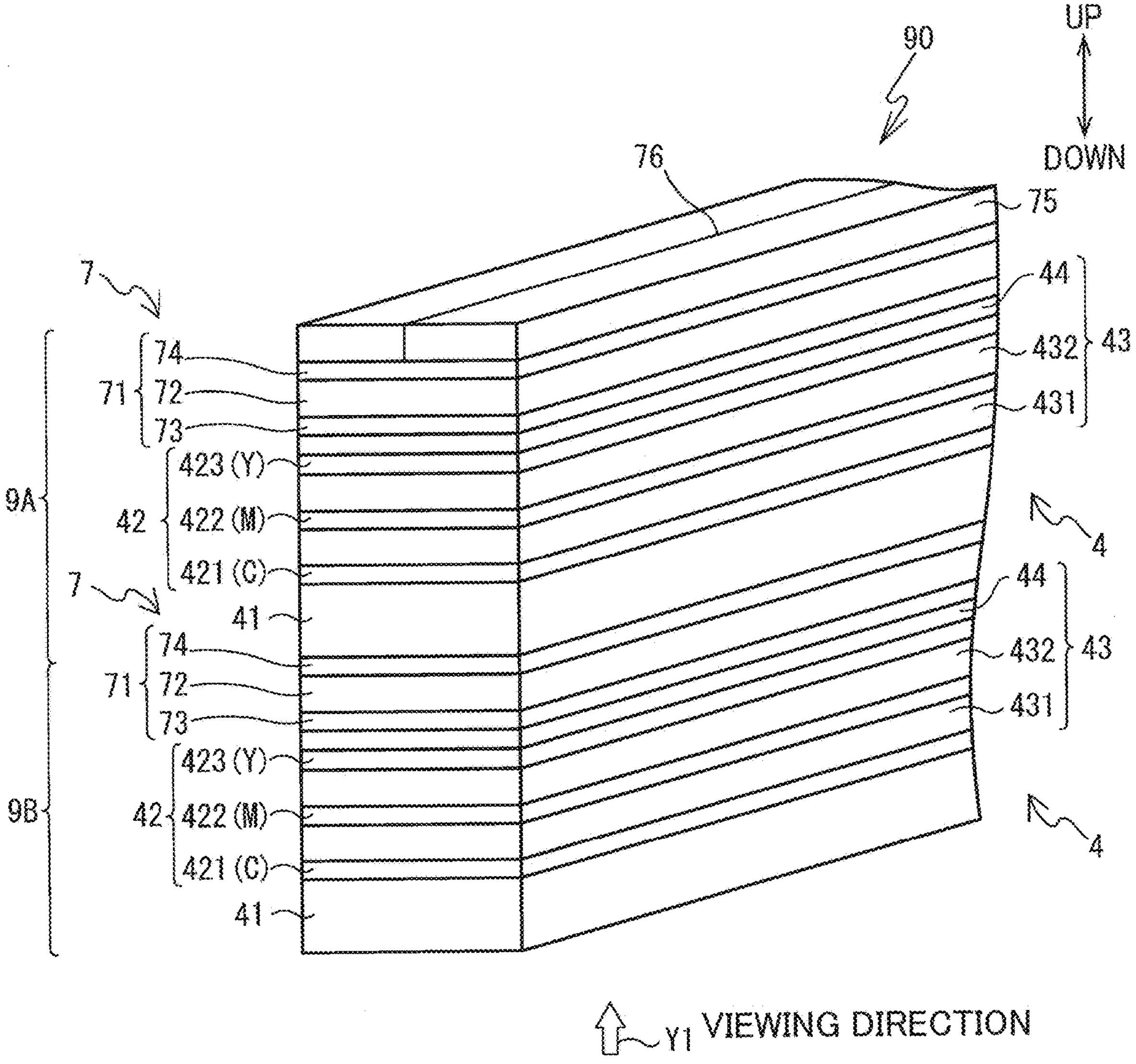
FIG. 8 is a perspective view of a composite label created by bonding two labels together.

The structure of the composite label 90 will be described next with reference to FIG. 8. A composite label denotes a label that is created by laminating a plurality of labels in the thickness direction. The composite label 90 is configured of two labels 9A and 9B that are bonded together. As one method for creating the composite label 90, the user places the label 9B on a tabletop with the base material 41 side facing downward. Next, the user peels off the release paper 75 of the adhesive tape 7 on the top surface of the label 9B to expose the second adhesive layer 74. The user places the label 9A with the base material 41 side facing downward on the second adhesive layer 74 to bond the label 9A to the label 9B, creating a single composite label 90.

The user views the composite label 90 from the base material 41 side of the label 9B (i.e., the bottom side of the composite label 90 in FIG. 8), as indicated by the viewing direction Y1. As described above, the heat-sensitive tapes 4 and double-sided adhesive tapes 71 in the labels 9A and 9B have overall visible light transmittance. Thus, when viewing the composite label 90 from the base material 41 side, the user can see superimposed colors (i.e., printed images) developed in all heat-sensitive layers 42 of the labels 9A and 9B through the base material 41. Since the double-sided adhesive tape 71 is transparent, as described above, the user can see the background of the composite label 90 when viewing the composite label 90 from the base material 41 side. The user can peel the release paper 75 off the double-sided adhesive tape 71 and affix the composite label 90 to a given wall, mount, or the like.

Next, examples for using the composite label 90 will be described with reference to FIGS. 9A and 9B. As described above, the composite label 90 can expand the color gamut from that expressible in a single label 9. Thus, there are various applications that can take advantage of the effect of such a composite label 90.

A first application will be described. As described above, the first heat-sensitive layer 421 (C), second heat-sensitive layer 422 (M), and third heat-sensitive layer 423 (Y) are laminated in order from the base material 41 side of the label 9 (see FIG. 4C). With this arrangement of heat-sensitive layers 42, green is difficult to render in a single label 9 since expressing green would require developing colors in the first heat-sensitive layer 421 (C) and third heat-sensitive layer 423 (Y). This would require controlling the first heat-sensitive layer 421 (C) and third heat-sensitive layer 423 (Y) to develop colors but not the second heat-sensitive layer 422 (M), which is the middle layer between the other two. In this case, green can be more properly rendered by creating a composite label 91 shown in FIG. 9A than with a single label 9.

Figure 9A:
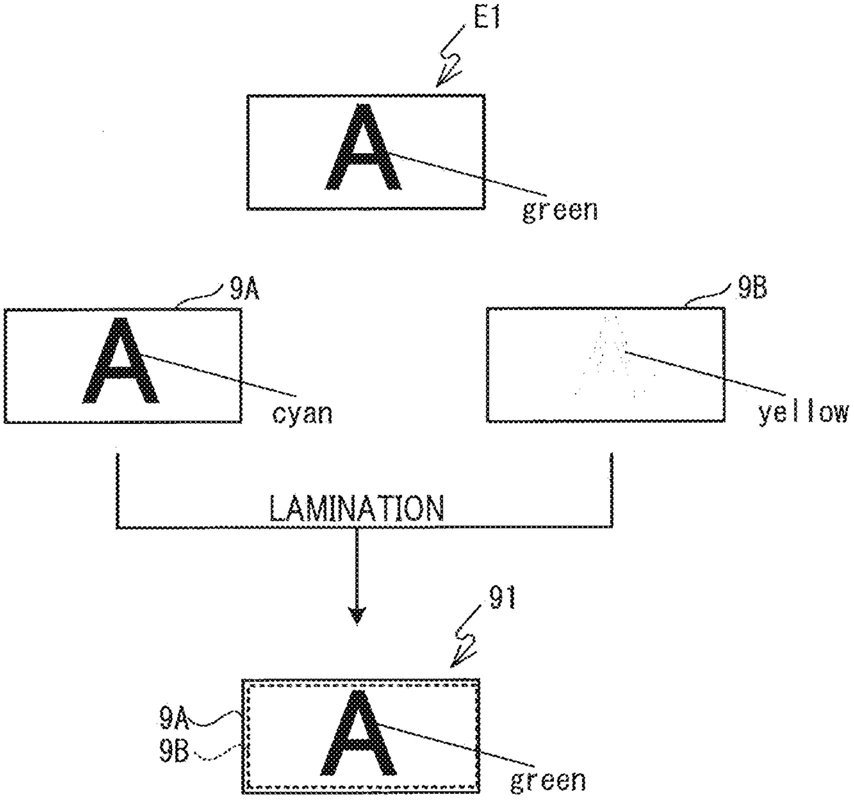
FIG. 9A is an explanatory diagram illustrating an example for using the composite label.

FIG. 9A shows an example of image data E1 for an image that includes a green character "A". The printing device 1 creates print data based on the image data E1. However, when printing an image on the label 9 based on this print data, the printing device 1 cannot easily render green according to the reason described above.

Figure 11:
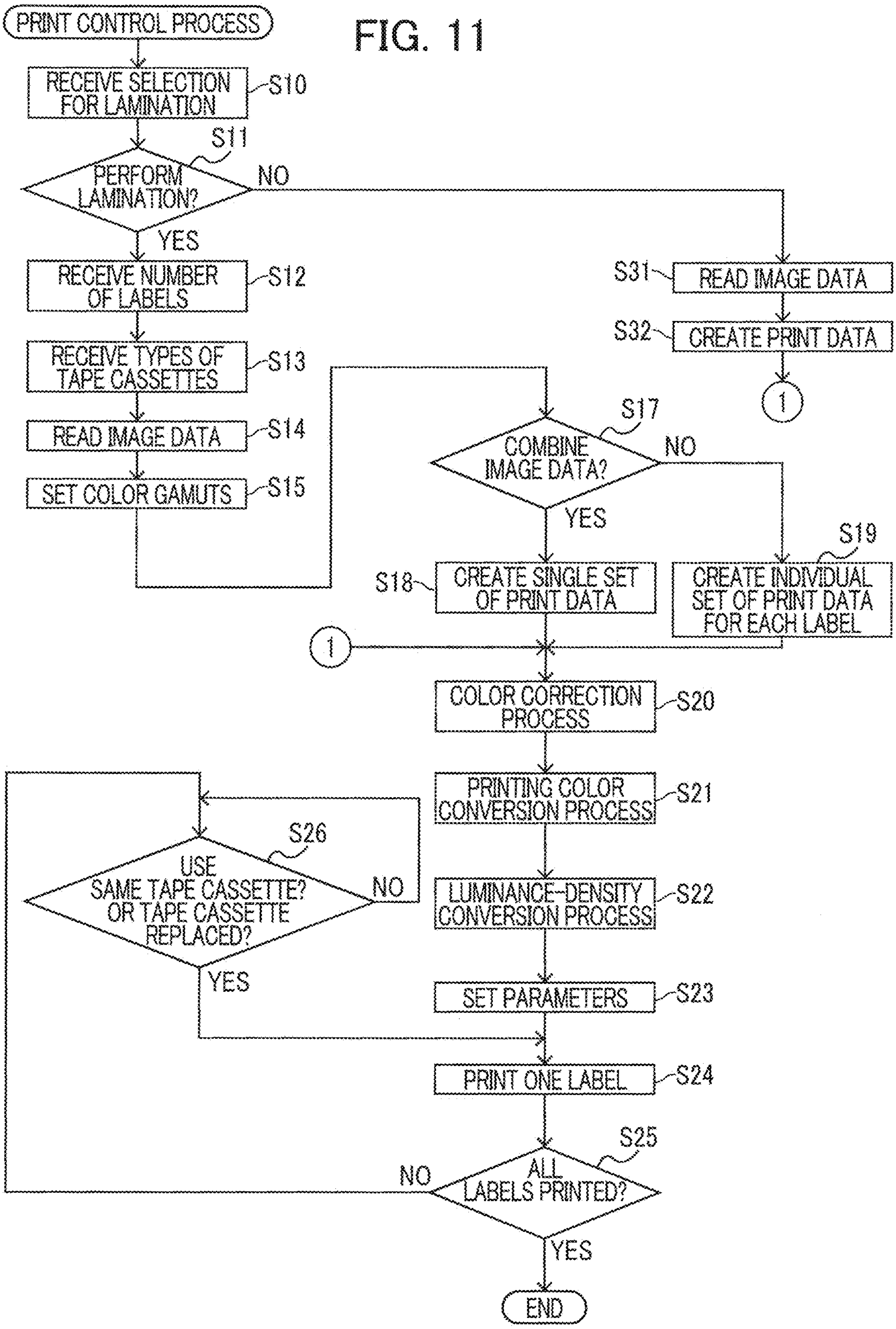
FIG. 11 is a flowchart illustrating steps in a print control process.

In this case, the printing device 1 executes a print control process described later with reference to FIG. 11 to create individual labels 9A and 9B having the character "A" printed in different colors. Specifically, the character color is cyan in the label 9A and yellow in the label 9B. The composite label 91 is created by bonding the labels 9A and 9B together. When the user views the composite label 91 from the base material 41 side, the overlapped cyan "A" and yellow "A" enable the user to perceive that the character color of the "A" is a green color closer to the character color of the "A" represented by the image data E1 Hence, the composite label 91 can express a color closer to the color of the image represented by the image data E1.

Next, a second application will be described. Since the heat-sensitive layers 42 in the label 9 have visible light transmittance, as described above, the heat-sensitive layers 42 are transparent even at positions where color is developed. Hence, a color tends to appear too light when developed individually, even at maximum color development. Increasing the size of the color dots being developed would require the application of a high voltage in order to print quickly at a high temperature. In this case, a darker color can be rendered by creating a composite label 92 shown in FIG. 9B.

Figure 9B:
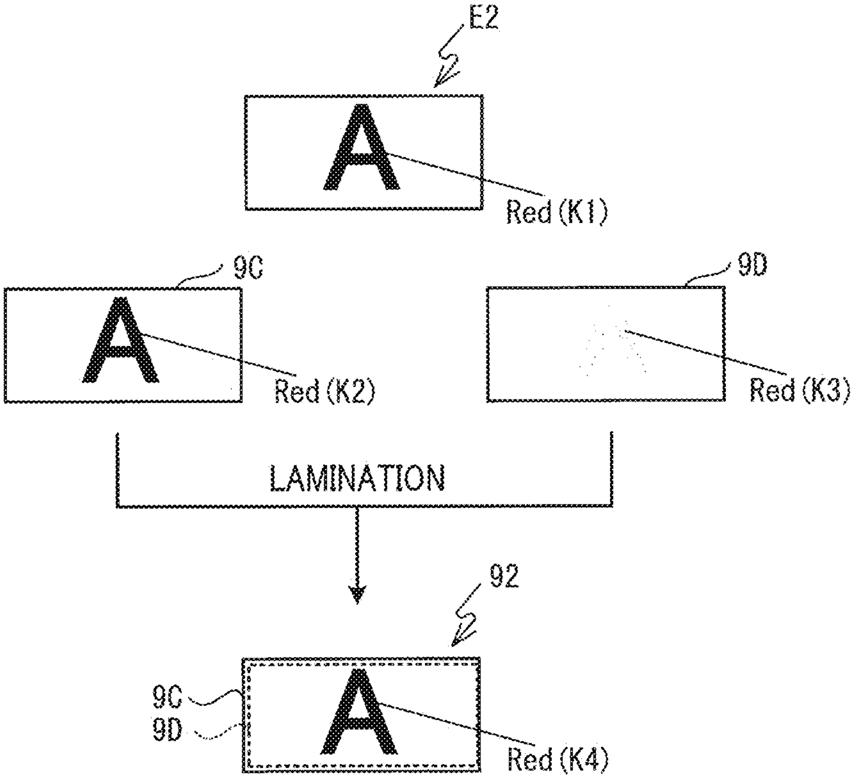
FIG. 9B is an explanatory diagram illustrating another example for using the composite label.

FIG. 9B shows an example of image data E2 for an image that includes the character "A" formed in red at a color density K1. The color density is the absolute density but can be replaced with transmittance in the case of absolute transmission density. The printing device 1 creates print data based on the image data E2. However, when the printing device 1 prints an image on the label 9 based on this print data, the color appears lighter than the color density K1 owing to the above reason.

In this case, the printing device 1 executes the print control process described later with reference to FIG. 11 to create individual labels 9C and 9D depicting "A" at different color densities. Specifically, the color density is K2 in the label 9C and K3 in the label 9D. Here, "different color densities" is the same concept as "different colors," For example, the color density K2 in the label 9C may be set equivalent to the color density K1 in the image data E2, and the color density K3 in the label 9D may be lighter than the color density K2. The composite label 92 is created by bonding the labels 9C and 9D together. When viewing the composite label 92 from the base material 41 side, the user can perceive a character "A" having a color density K4 that is darker than the color density K2 owing to the "A" at the color density K2 overlapping the "A" of the color density K3. Through this process, a transparent composite label 92 can render a color closer to the image color represented by the image data E2.

Figure 10:
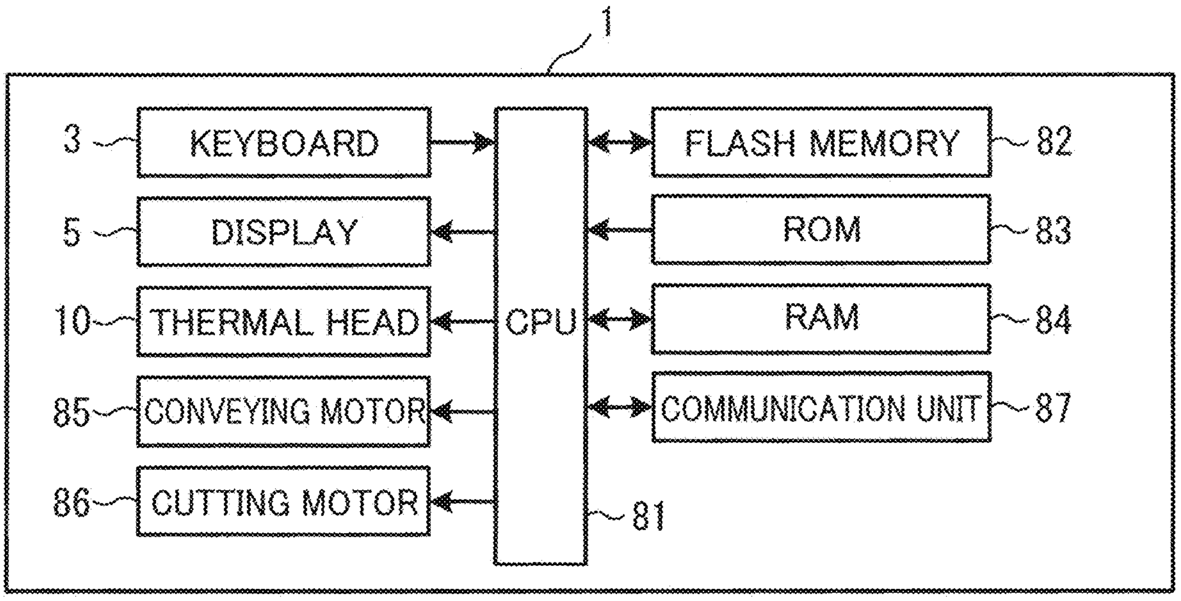
FIG. 10 is a block diagram illustrating the electrical configuration of the printing device.

Next, the electrical structure of the printing device 1 will be described with reference to FIG. 10. The printing device 1 is also provided with a central processing unit (hereinafter abbreviated as "CPU") 81, a flash memory 82, a read-only memory (hereinafter abbreviated as "ROM") 83, a random-access memory (hereinafter abbreviated as "RAM") 84, and a communication unit 87. The CPU 81 functions as a processor for controlling the printing device 1. The CPU 81 is electrically connected to the flash memory 82, ROM 83, RAM 84, keyboard 3, display 5, thermal bead 10, conveying motor 85, cutting motor 86, and communication unit 87. The flash memory 82 stores programs executed by the CPU 81, cassette information, color gamut information, and the like. Cassette information includes information on types of tape cassettes 30 and information on types of heat-sensitive tapes 4 accommodated in the tape cassettes 30. The color gamut information includes information on the color gamut for each type of heat-sensitive tape 4, information on color gamuts produced according to various combinations of heat-sensitive tapes 4 being bonded together, and the like. The ROM 83 stores various parameters required for executing the programs. The RAM 84 stores various temporary data, such as print data for forming images. The communication unit 87 can establish a wired or wireless connection with an external device (not shown) to communicate with the external device.

Next, the print control process will be described with reference to FIG. 11. When the power to the printing device 1 is turned on, the CPU 81 reads a print control program from the flash memory 82 to execute this process. In S10 of FIG. 11, the CPU 81 receives a selection for "lamination" via the keyboard 3. The CPU 81 stores information in the form of a flag, for example, indicating whether multiple labels are to be layered together. In S11 the CPU 81 determines whether lamination will be performed based on the flag stored in the RAM 84. If lamination will not be performed (S11: NO), in S31 the CPU 81 reads image data from the flash memory 82 and in S32 creates print data based on this image data. After creating the print data, the CPU 81 stores the created print data in the RAM 84 and advances to S20 described later.

However, if lamination is to be performed (S11: YES), in S12 the CPU 81 receives a number inputted via the keyboard 3 indicating the number of labels that will be bonded together. The CPU 81 stores this number in the RAM 84. In S13 the CPU 81 receives information via the keyboard 3 indicating the types of tape cassettes 30 being used for creating the labels. If the type of tape cassette will be different for each label, for example, the user inputs via the keyboard 3 the types of all tape cassettes being used.

Figure 12:
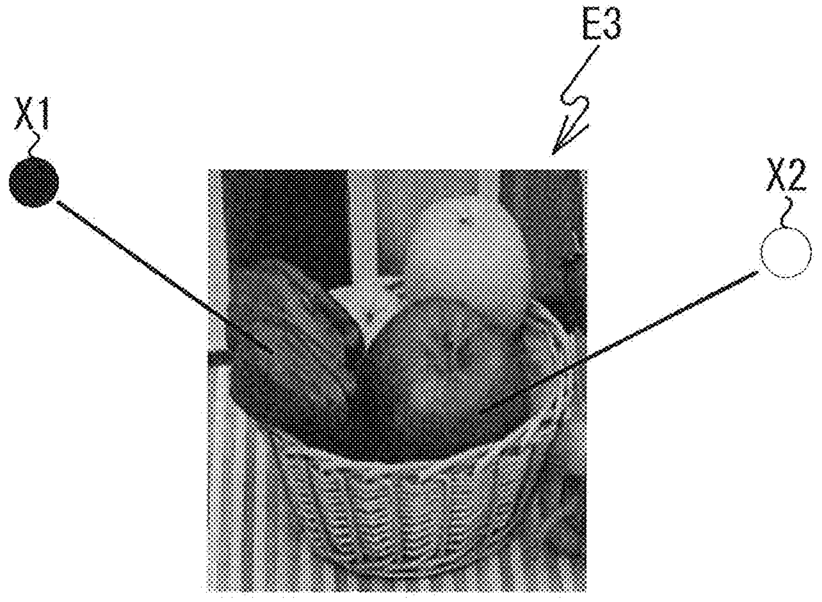
FIG. 12 is an explanatory diagram illustrating an example of image data read in the print control process.

In S14 the CPU 81 reads image data. The image data is read from among image data pre-stored in the flash memory 82. Alternatively, the CPU 81 may read image data that has been externally inputted. In one example of the present embodiment, the CPU 81 reads image data E3 for the image shown in FIG. 12. The image data E3 is image data for a color photograph taken of a basket of fruits and vegetables. The CPU 81 stores the color information for each pixel of the image data in the RAM 84. The color information is color codes specifying types of colors, for example. In the present embodiment, as shown in FIG. 12, X1 denotes an arbitrary pixel of a bell pepper, and X2 an arbitrary pixel of an apple. Color information for pixel X1 represents green, while color information for pixel X2 represents red.

In S15 the CPU 81 sets information on selectable color gamuts from among color gamut information stored in the flash memory 82 based on the number of labels received in S12 and the types of tape cassettes 30 received in S13. The CPU 81 stores this color gamut information in the RAM 84. As an alternative, the CPU 81 may receive a color gamut selection via the keyboard 3 in place of the information received in S12 and S13.

In S17 the CPU 81 determines whether to combine image data. Since the user is laminating labels, the CPU 81 creates image data for the number of labels being laminated. The user can select via the keyboard 3 whether or not to combine (i.e., concatenate) image data. When image data is to be combined (S17: YES), in S18 the CPU 81 creates a single set of print data. When image data is not to be combined (S17: NO), in S19 the CPU 81 creates an individual set of print data for each label.

Figure 13A:
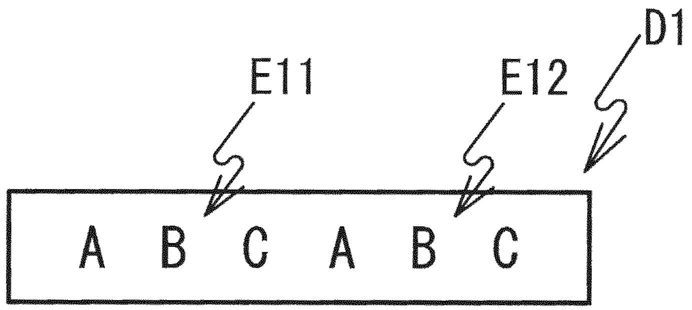
FIG. 13A is a conceptual diagram explaining print data for creating a single label having two concatenated labels.

Here, examples of creating two labels for lamination having the printed image "ABC" will be described with reference to FIG. 13. When combining image data, the CPU 81 creates a single set of print data D1 by concatenating the image data E11 and E12 for two labels, as illustrated in FIG. 13A. The printing device 1 creates a single label having two concatenated labels by printing the heat-sensitive tape 4 based on the print data D1.

Figure 13B:
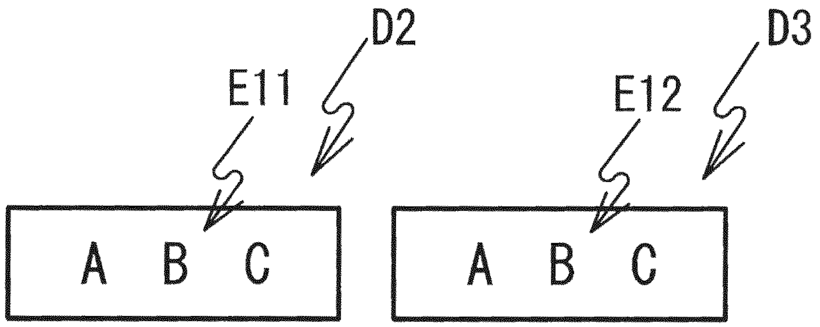
FIG. 13B is a conceptual diagram explaining print data for creating two individual labels.

However, when image data is not being combined, the CPU 81 creates two sets of print data D2 and D3 from the separate sets of image data E11 and E12, as illustrated in FIG. 13B. By printing the heat-sensitive tape 4 based on the print data D2 and D3, the printing device 1 creates two labels on which the image data E11 and image data E12 are respectively printed.

Creating a single label with two concatenated labels requires less margin between the two labels than when creating the two labels individually. However, creating the two labels individually eliminates the need for the user to cut through the center of the concatenated labels to produce the individual labels. Note that the printing device 1 of the present embodiment is provided with the cutting mechanism 16. However, in the ease of a printing device not provided with a cutting mechanism 16, the CPU 81 may determine in S17 that image data is to be concatenated (817: YES) and in S18 may create a single set of print data. The CPU 81 stores the print data created in S18 or S19 in the RAM 84.

In S20 the CPU 81 executes a color correction process on all pixels in the print data created above and in S21 executes a printing color conversion process. Here, the color correction process and printing color conversion process executed on arbitrary pixels X1 and X2 shown in FIG. 12 will be described for each of the following three scenarios (1) through (3): (1) printing a single label 9 with no lamination, (2) printing two labels 9 for lamination using the same type of tape cassette 30, and (3) printing two labels 9 for lamination using different types of tape cassettes. Note that scenario (1) corresponds to the color correction process (S20) and the printing color conversion process (S21) performed for a label that will not be laminated on another label (S11: NO).

(1) Printing a Single Label 9 with No Lamination

Figure 14A:
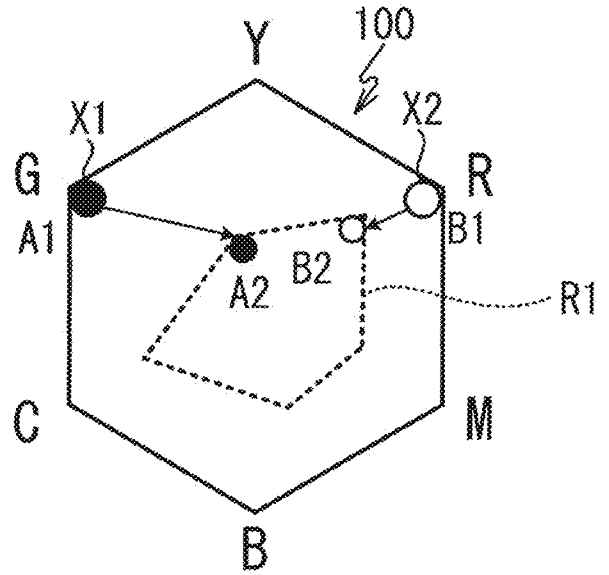
FIGS. 14A and 14B are explanatory diagrams illustrating a color correction process and a printing color conversion process performed in scenario (1)

Since the color information for pixel X1 represents green, pixel X1 is located at position A1 in the standard color gamut 100, as illustrated in FIG. 14A. Position A1 is near the G vertex. Since the color information for pixel X2 represents red, pixel X2 is located at position B1 in the standard color gamut 100. Position B1 is near the R vertex. The color gamut of the tape cassette 30 is the color gamut R1 for the tape cassette 30 mounted in the cassette attachment portion 8. The CPU 81 executes the color correction process on pixels X1 and X2. As described above, the color gamut R1 is smaller than the standard color gamut 100. In consideration for this reduced color space, the printing device 1 associates the standardized color signals (R, G, B) with color signals for the printing device 1 (R', G', B'). Through this process, the location of pixel X1 is corrected from position A1 to position A2 within the color gamut R1, while the location of pixel X2 is corrected from position B1 to position B2 within the color gamut R1. Position A2 is the location in the color gamut R1 corresponding to green. Position B2 is the location in the color gamut R1 corresponding to red. Thus, the color information for pixels X1 and X2 are corrected.

Figure 14B:
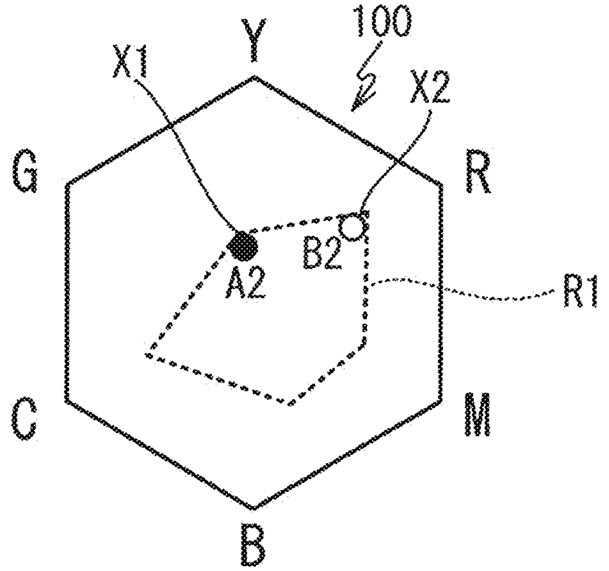

Next, the CPU 81 executes the printing color conversion process on pixels X1 and X2 whose color information has been corrected to those corresponding to positions A2 and B2 within the color gamut R1. In the printing color conversion process, the CPU 81 converts the colors of pixels X1 and X2 to colors that the printing device 1 can print. However, the printing device 1 only prints a single label 9 in scenario (1) since lamination will not be performed. Consequently, color information for pixels X1 and X2 is left changed and the pixels remain assigned to the same positions, i.e., positions A2 and B2, in the color gamut R1 set in the color correction process, as illustrated in FIG. 14B.

(2) Printing Two Labels 9 for Lamination Using the Same Type of Tape Cassette 30

Figure 15A:
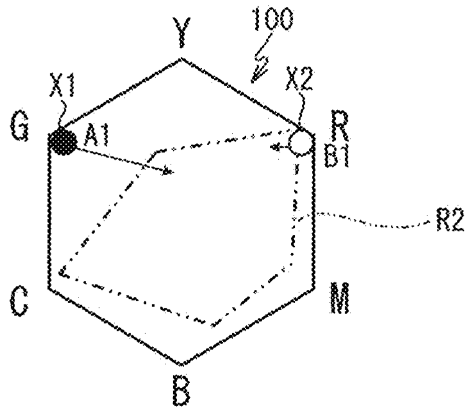
FIGS. 15A through 15D are explanatory diagrams illustrating the color correction process and the printing color conversion process performed in scenario (2)
Figure 15B:
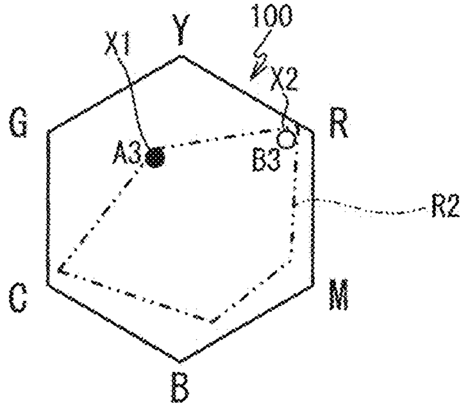

Since the color information for pixel Xl represents green, pixel X1 is located at position A1 in the standard color gamut 100, as illustrated in FIG. 15A. Position A1 is near the G vertex. Since the color information for pixel X2 represents red, pixel X2 is located at position B1 in the standard color gamut 100. Position B1 is near be R vertex. Further, since the printing device 1 will print two labels 9 using the same type of tape cassette 30 in scenario (2), the color gamut that can be expressed when laminating two labels 9 is the color gamut R2. Note that scenario (2) assumes that the color gamut R2 has been set in S15 selected in S16. By executing the color correction process, the CPU 81 corrects the color information for pixels X1 and X2 to locations in the color gamut R2, as illustrated in FIG. 15A. As shown in FIG. 15B, the location of pixel X1 is corrected from position A1 to position A3 within the color gamut R2, and the location of pixel X2 is corrected from position B1 to position B3 within the color gamut R2. Position A3 is the position in the color gamut R2 corresponding to green. Position B3 is the position in the color gamut R2 corresponding to red.

Next, the CPU 81 executes the printing color conversion process on pixels X1 and X2 that have been corrected to the corresponding positions A3 and B3 in the color gamut R2. Here, since the number of labels received in S12 is two and a single type of tape cassette 30 has been received in S13, both the first label 9 and the second label 9 will be printed using the same type of tape cassette 30. Therefore, the color gamut for the tape cassette 30 in both cases is the color gamut R1.

Figure 15C:
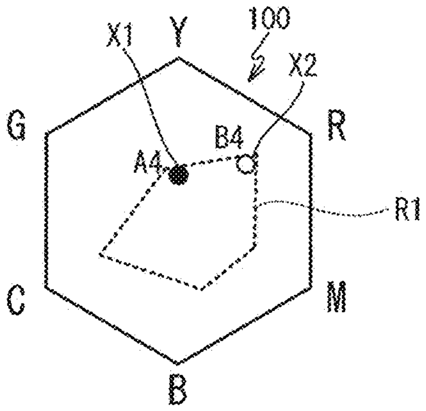

The CPU 81 assigns pixels Xl and X2 corrected to locations the color gamut R2 to locations in the color gamut R1 for the first label 9, as shown in FIG. 15C. Specifically, pixel X1 is corrected from position A3 to position A4 within the color gamut R1 and pixel X2 is corrected from position B3 to position B4 within the color gamut R1. Position A4 is the location in the color gamut R1 corresponding to yellow, and position B4 is the location in the color gamut R1 corresponding to red.

Figure 15D:
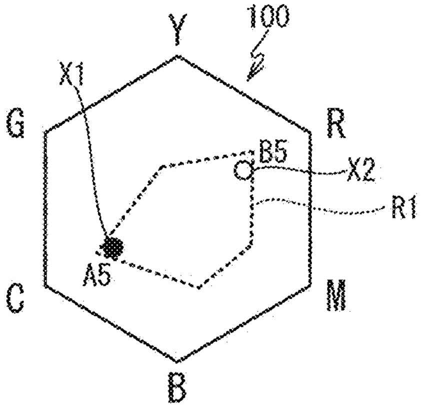

As with the first label 9, the CPU 81 also assigns pixels X1 and X2 corrected to locations in the color gamut R2 to locations within the color gamut R1 for the second label 9, as illustrated in FIG. 15D. Thus, pixel X1 is corrected from position A3 to position A5 within the color gamut R1, while pixel X2 is corrected from position B3 to position B5 within the color gamut R1. Position A5 is the location in the color gamut R1 corresponding to cyan. Position B5 is the location in the color gamut R1 corresponding to red, i.e., the same location as position B4 assigned for the first label 9. Hence, the color information for pixel X1 represents yellow in the first label 9 and cyan in the second label 9. Thus, different color information is assigned to the same pixel X1 in the two labels 9.

Figure 16A:
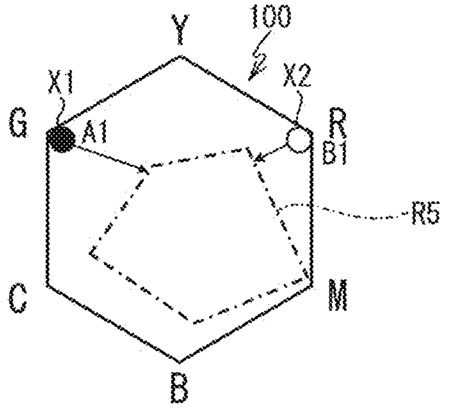
FIG. 16A through 16D are explanatory diagrams illustrating the color correction process and the printing color conversion process performed in scenario (3)

(3) Printing on Two Labels 9 for Lamination Using Two Different Types of Tape Cassettes Since the color information for pixel X1 represents green, pixel X1 is located at position A1 in the standard color gamut 100, as illustrated in FIG. 16A. Position A1 is near the G vertex. Since the color information for pixel X2 represents red, pixel X2 is located at position B1 in the standard color gamut 100. Position B1 is near the R vertex. The printing device 1 will print the two labels 9 using two different types of tape cassettes. Here, the two different types of tape cassettes will be assumed to be a tape cassette 30 accommodating a heat-sensitive tape 4 having a three-layer structure for colors C, M, and Y, and a tape cassette accommodating a heat-sensitive tape having a single layer with the color M.

Figure 16B:
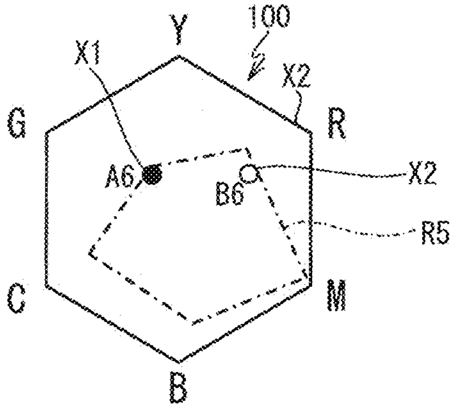

The printing device I prints the two labels 9 using the two types of tape cassettes described above. As described earlier, the heat-sensitive tape 4 with the three CMY colors has the color gamut R1, and the heat-sensitive tape with the single M color has the color gamut R4 (see FIG. 7). Consequently, the two labels 9 when laminated together can express the color gamut R5. Note that scenario (3) assumes that the color gamut R5 has been set in S15. By executing the color correction process as shown in FIG. 16A, the CPU 81 corrects the color information for pixels X1 and X2 to locations in the color gamut R5. As shown in FIG. 16B, pixel X1 is corrected from position A1 to position. A6 within the color gamut R5, and pixel X2 is corrected from position B1 to position B6 within the color gamut R5. Position A6 is the location in the color gamut R5 corresponding to green. Position B6 is the location in the color gamut R5 corresponding to red.

Next, the CPU 81 executes the printing color conversion process on pixels X1 and X2 that have been corrected to the corresponding positions A6 and B6 in the color gamut R5. Here, since the number of labels received in S12 is two and two types of tape cassettes have been received in S13, the first label 9 will be printed using the tape cassette 30 that accommodates the heat-sensitive tape 4 with the three CMY colors, and the second label 9 will be printed using the tape cassette that accommodates the heat-sensitive tape with the single M color. As described above, the heat-sensitive tape 4 has the color gamut R1 and the heat-sensitive tape with the single color magenta has the color gamut R4.

Figure 16C:
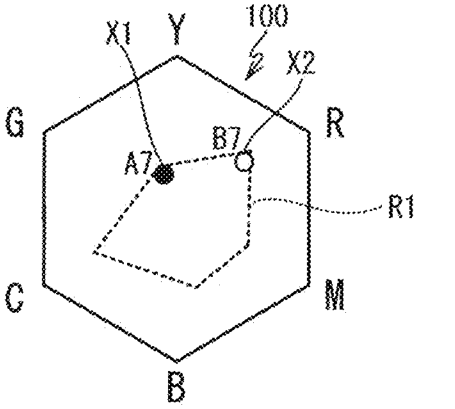
Figure 16D:
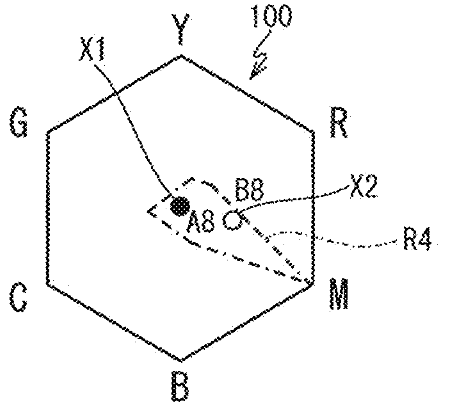

Therefore, pixels X1 and X2 that have been corrected to locations in the color gamut R5 are assigned to locations in the color gamut R1 for the first label 9, as illustrated in FIG. 16C. Here, pixel X1 is corrected from position A6 to position A7 within the color gamut R1, and pixel X2 is corrected from position B6 to position B7 within the color gamut R1. Position A7 is the location in the color gamut R1 corresponding to green, and position B7 is the location in the color gamut R1 corresponding to red. For the second label 9, the pixels X1 and X2 corrected to locations in the color gamut R5 are assigned to locations in the color gamut R4, as illustrated in FIG. 16D. Specifically, pixel X1 is corrected from position A6 to position A8 within the color gamut R4, and pixel X2 is corrected from position B6 to position B8 within the color gamut R4. Position A8 is the location in the color gamut R4 nearest the center, i.e., the position corresponding to white (transparent). Thus, color information for pixel X1 is green in the first label 9 and white (transparent) in the second label 9 and. Hence, the two labels 9 are assigned different color information for the same pixel X1.

Thus, in each of the scenarios (1) through (3) described above, the CPU 81 executes the color correction process (S20) and the printing color conversion process (S21) on all pixels in the image data included in the print data created in S18, S19, or S32. The CPU 81 stores the print data produced from executing each process in the RAM 84.

Returning to FIG. 11, in S22 the CPU 81 executes a luminance-density conversion process. The luminance-density conversion process functions to convert the luminance represented by RGB values to density represented by CMY values. In S23 the CPU 81 sets parameters for power to be inputted into the heating elements 11 of the thermal head 10 based on the converted CMY densities. In S24 the CPU 81 prints one label based on print data stored in the RAM 84.

In S25 the CPU 81 determines whether all labels have been printed. If all labels have been printed (S25: YES), the CPU 81 ends the print control process. Note that only a single label will be printed when lamination has not been selected in S10.

However, if there exists a second label to be printed based on the print data stored in the RAM 84 (S25: NO), in S26 the CPU 81 determines whether the same tape cassette is to be used for printing the second label (i.e., when only one type of tape cassette has been received in S13) and, if not, whether the tape cassette in the cassette attachment portion 8 has been replaced. When a different tape cassette from that used for printing the first label is to be used for printing the second label, the user must replace the tape cassette mounted in the cassette attachment portion 8. If the tape cassette has not been replaced (S26: NO), the CPU 81 returns to S26 and waits until the tape cassette is replaced. When the CPU 81 determines that the tape cassette has been replaced (S26: YES), in S24 the CPU 81 prints the second label. In addition, when only one type of the tape cassette has been received in S13, the CPU 81 determines that the same tape cassette is to be used (S26: YES), and in S24 prints the second label using the same tape cassette.

By executing the print control process described above, the CPU 81 can print a plurality of labels for lamination. Thus, when an image based on the image data E1 is to be printed on two labels 9 for lamination, for example, the green bell pepper portion of the image is printed in yellow on the first label 9 and in cyan on the second label 9. Subsequently, a composite label 90 is configured by laminating the two labels 9 together. When viewing the composite label 90 from the base material 41 side, the user can see a proper green for the bell pepper portion owing to the combination of cyan and yellow.

As described above, the printing device 1 according to the present embodiment is provided with the thermal head 10, and the thermal head 10 has the heating elements 11. The CPU 81 of the printing device 1 creates print data in order to form an image on the heat-sensitive tape 4 of the label 9. The heat-sensitive tape 4 is transparent and is configured of a plurality of heat-sensitive layers 42 laminated together. Each of the heat-sensitive layers 42 develops a different color when heat is applied. The print data enables the CPU 81 to drive the heating elements 11 based on the image data. The CPU 81 prints an image by applying heat from the heating elements 11 to the heat-sensitive tape 4. The CPU 81 determines whether the plurality of labels 9 will be used by laminating at least one of the labels 9 on another. The CPU 81 creates print data based on these determination results. By printing the heat-sensitive tape 4 based on the print data, the printing device 1 creates labels 9 that can be laminated on one another. Since the gamut of colors expressible by the labels 9 is expanded when two or more labels 9 are laminated together, the laminated labels 9 can express specific colors that are otherwise difficult to reproduce by printing a single label 9. Further, conventional printing devices had to apply high voltages to the heating elements 11 in order to increase the size of the color dots being developed in the heat-sensitive tape 4 since printing is performed quickly at a high temperature. However, the printing device 1 can express dark colors even with low power by overlaying two or more colors.

In the above description, the label 9 is an example of the claimed label, and the heat-sensitive tape 4 is an example of the claimed printing medium. The CPU 81 is an example of the claimed processor. The process of S18 through S21 is an example of the claimed (a) creating, the process of S24 in FIG. 11 is an example of the claimed (b) driving, and the process of S11 in FIG. 11 is an example of the claimed (c) determining. Green is an example of the claimed specific color. The flash memory 82 is an example of the claimed memory. The color gamut R1 is an example of the claimed first color gamut, the color gamut R4 is an example of the claimed second color gamut, and the color gamut R5 is an example of the claimed combined color gamut. The process of S20 and S21 in FIG. 11 is an example of the claimed (e) combining, (f) creating, (g) converting, and (h) converting.

Figure 17:
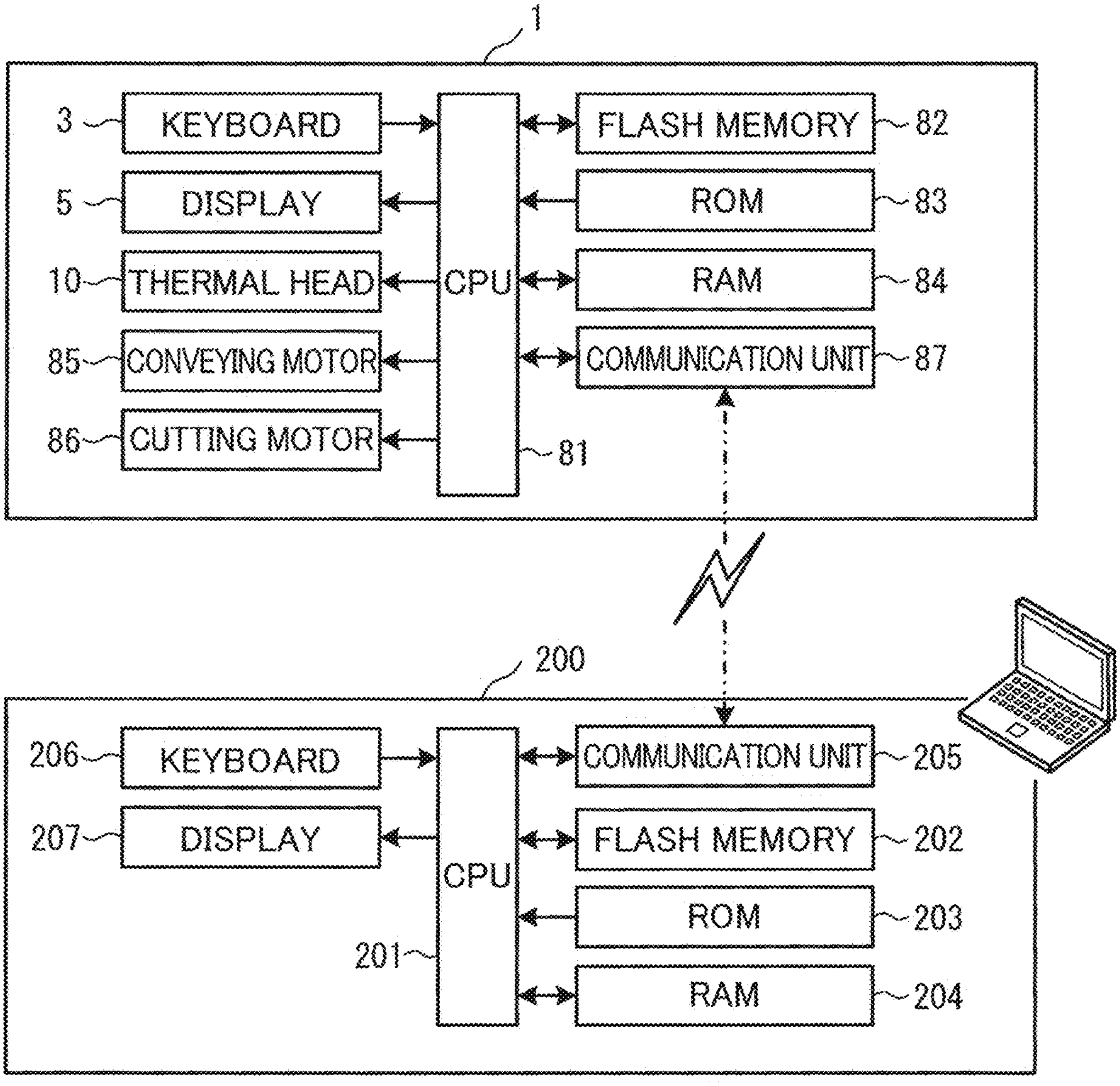
FIG. 17 is a block diagram illustrating the electrical configuration of the printing device and a data creating device.

While the description has been made in detail with reference to a specific embodiment, it would be apparent to those skilled in the art that various changes and modifications may be made thereto. For example, the CPU 81 in the printing device 1 according to the present embodiment executes the print control process of FIG. 11. However, steps S10 through S23 in the print control process of FIG. 11 may instead be executed by a CPU 201 of a data creating device 200 shown in FIG. 17, for example. The data creating device 200 may be a dedicated terminal or an external terminal such as a desktop computer, a laptop computer, or a smartphone. The data creating device 200 is provided with the CPU 201, a flash memory 202, a ROM 203, a RAM 204, a communication unit 205, a keyboard 206, a display 207, and the like. The communication unit 205 connects wirelessly to the communication unit 87 of the printing device 1. Note that the communication unit 205 may also be connected to the communication unit 87 by a cable. The CPU 201 executes steps S10 through S23 of the print control process and may transmit the created print data to the printing device 1 via the communication unit 205. With the printing device I executing a print based on the print data received from the data creating device 200, the data creating device 200 can obtain the same effects described in the present embodiment.

The adhesive tape 7 in the embodiment described above may be configured of the sheet 72 and first adhesive layer 73. In this case, the user may apply adhesive to the surface of the sheet 72 on the side opposite the first adhesive layer 73 (i.e., the exposed surface) after completion of the label 9, for example. Alternatively, the adhesive tape 7 may be self-adhesive.

The plurality of heat-sensitive layers 42 in the embodiment described above may be configured of just two layers. In other words, the third heat-sensitive layer 423 may be omitted and, hence, the second heat-insulating layer 432 may also be omitted. In this case, the first heat-sensitive layer 421 may be formed by applying a chemical agent to the bottom surface of the first heat-insulating layer 431 while the second heat-sensitive layer 422 is formed by applying a chemical agent to the top surface of the first heat-insulating layer 431. Thus, it is sufficient for the heat-sensitive tape 4 to include at least one heat-insulating layer.

Alternatively, the plurality of heat-sensitive layers 42 in the embodiment described above may be configured of four or more layers. For example, a fourth heat-sensitive layer (not shown) may be provided on the opposite side of the third heat-sensitive layer 423 from the second heat-sensitive layer 422. In this case, the fourth heat-sensitive layer develops a fourth color when heated above a fourth temperature. The fourth temperature is higher than the third temperature. The fourth color may be black, for example. In this configuration, a third heat-insulating layer (not shown) is provided between the third heat-sensitive layer 423 and the fourth heat-sensitive layer in the thickness direction.

The first color, second color, and third color in the embodiment described above may be colors other than cyan, magenta, and yellow, respectively. For example, the first, second, and third colors may all be the same color. When multiple layers of the same color are superimposed in the label 9, the label 9 can depict depth in the formed image.

In the embodiment described above, the plurality of heat-sensitive layers 42 may be formed by applying a chemical agent to the top surfaces of the heat-insulating layers 43. Alternatively, the heat-sensitive layers 42 may be preformed in a sheet-like shape and bonded by adhesive to the respective heat-insulating layers 43.

In the embodiment described above, the heat-sensitive tape 4 has a plurality of heat-sensitive layers 42, but the heat-sensitive tape 4 may instead have just a single heat-sensitive layer. In this case, the base material 41, first heat-sensitive layer 421, first heat-insulating layer 431 and overcoat layer 44 are laminated in the order given, for example. When the heat-sensitive tape 4 possesses just a single heat-sensitive layer, both the first heat-insulating layer 431 and the overcoat layer 44 may be omitted. In this case, the single heat-sensitive layer may be formed by applying a chemical agent to the top surface of the base material 41.

In the print control process of the present embodiment (see FIG. 11), the CPU 81 executes the color correction process (S20) and the printing color conversion process (S21) on print data for all labels being laminated. After executing other processes in S22 and S23, the CPU 81 prints the labels one at a time (S24). However, the CPU 81 may instead print the first label (S24) after completing: the process in S20 through S23 for the first label and thereafter may repeat the process in S20 through S23 for the second and subsequent labels while executing a print each time.

In place of the CPU 81, the printing device 1 may employ a microcomputer, application-specific integrated circuits (ASICs), field-programmable gate arrays (FPGAs), or the like as the processor. The print control process may be a distributed process performed by a plurality of processors. The non-transitory storage medium may be any storage medium capable of holding information, regardless of the duration that the information is stored. The non-transitory storage medium need not include transitory storage media (conveyed signals, for example). The program may be downloaded from a server connected to a network (i.e., transmitted as a transmission signal) and stored in the flash memory 82, for example. In this case, the program may be saved in a non-transitory storage medium, such as a hard disk drive provided in the server.

The variations described above may be combined in any way that does not produce inconsistencies.

What is claimed is:

1. A printing device comprising:
a thermal head comprising a heating element; and
a processor configured to perform:
(a) creating print data based on image data representing an image to be printed on a printing medium, the printing medium including a heat-sensitive layer configured to develop a color when heat is applied from the heating element; and
(b) driving the heating element to apply heat to the printing medium according to the print data created in (a),
wherein the processor is configured to further perform:
(c) determining whether to create a plurality of labels for lamination using at least one printing medium including a first printing medium, the first printing medium being transparent and including a plurality of heat-sensitive layers laminated together, each of the plurality of heat-sensitive layers being configured to develop a different color when heat is applied from the heating element,
wherein the (a) creating is performed in accordance with a determination result in (c), and
wherein the (a) creating creates, in response to determining in (c) to create the plurality of labels for lamination using the at least one printing medium, the print data including a plurality of sets of color information, each of the plurality of sets of color information representing a color of the image to be printed on a corresponding one of the plurality of labels, the plurality of sets of color information being at least partially different from one another.

2. The printing device according to claim 1, wherein the processor is configured to further perform:
(d) determining, in response to determining in (c) to create the plurality of labels for lamination using the at least one printing medium, whether to create the plurality of labels using only the first printing medium, and
wherein the (a) creating creates, in response to determining in (d) to create the plurality of labels using only the first printing medium, the print data for creating the plurality of labels as a single concatenated label.

3. The printing device according to claim 1, wherein the image includes a specific region having a specific color, and
wherein the plurality of sets of color information included in the print data created in (a) represents respective ones of a plurality of colors for the specific region of the image, the plurality of colors being different from one another, the specific color being expressed by overlaying the plurality of colors on one another.

4. The printing device according to claim 3, wherein the specific color is expressed using at least two heat-sensitive layers from among the plurality of heat-sensitive layers, the at least two heat-sensitive layers including a first heat-sensitive layer and a second heat-sensitive layer, the plurality of heat-sensitive layers including a third heat-sensitive layer other than the at least two heat-sensitive layers, the third heat-sensitive layer being positioned between the first heat-sensitive layer and the second heat-sensitive layer in the first printing medium, the first heat-sensitive layer being configured to develop a first color when heat is applied from the heating element, the second heat-sensitive layer being configured to develop a second color different from the first color when heat is applied from the heating element, and
wherein the plurality of labels includes a first label and a second label and the print data created in (a) includes first color information corresponding to the first label and second color information corresponding to the second label, the first color information representing the first color for the specific region of the image.

5. The printing device according to claim 1, further comprising a memory configured to store color gamut information indicating a first color gamut that the first printing medium can reproduce when heat is applied from the heating element,
wherein the at least one printing medium further includes a second printing medium that can reproduce a second color gamut when heat is applied from the heating element, the plurality of labels including a first label and a second label, the first printing medium corresponding to the first label, the second printing medium corresponding to the second label, and
wherein the (a) creating comprises:
(e) combining the first color gamut and the second color gamut to obtain a combined color gamut;

(f) creating temporary print data for printing the image based on the combined color gamut;

(g) converting the temporary print data to first print data for creating the first label based on the first color gamut; and (h) converting the temporary print data to second print data for creating the second label based on the second color gamut.

6. A data creating device configured to create print data based on image data representing an image to be printed on a printing medium with a printing device, the printing device including a thermal head having a heating element, the printing medium including a heat-sensitive layer configured to develop a color when heat is applied from the heating element driven according to the print data, the data creating device comprising:

a processor configured to perform:

(a) determining whether to create a plurality of labels for lamination using at least one printing medium, one of the at least one printing medium being transparent and including a plurality of heat-sensitive layers laminated together, each of the plurality of heat-sensitive layers being configured to develop a different color when heat is applied from the heating element; and (b) creating the print data in accordance with a determination result in (a), wherein the (b) creating creates, in response to determining in (a) to create the plurality of labels for lamination using the at least one printing medium, the print data including a plurality of sets of color information, each of the plurality of sets of color information representing a color of the image to be printed on a corresponding one of the plurality of labels, the plurality of sets of color information being at least partially different from one another.

* * * * *